United States Patent [19]
Uenohara et al.

[11] Patent Number: 6,024,199
[45] Date of Patent: Feb. 15, 2000

[54] CLUTCH COVER ASSEMBLY

[75] Inventors: Norihisa Uenohara, Ibaraki; Hiroshi Uehara, Hirakata; Satoshi Isoda, Katano, all of Japan

[73] Assignee: Exedy Corporation, Osaka, Japan

[21] Appl. No.: 09/198,277

[22] Filed: Nov. 24, 1998

[30]    Foreign Application Priority Data

Dec. 12, 1997 [JP] Japan .................................. 9-343361

[51] Int. Cl.[7] .................................................. F16D 13/75
[52] U.S. Cl. ..................................... 192/70.25; 192/111 A
[58] Field of Search ........................... 192/70.25, 70.23, 192/111 A

[56]    References Cited

U.S. PATENT DOCUMENTS

| 5,419,418 | 5/1995 | Uenohara et al. | 192/70.25 |
| 5,570,768 | 11/1996 | Uenohara et al. | 192/70.25 |
| 5,884,741 | 3/1999 | Bokisch et al. | 192/70.25 |

*Primary Examiner*—Rodney H. Bonck
*Assistant Examiner*—Tisha D. Waddell
*Attorney, Agent, or Firm*—Shinjyu Global IP Counselors, LLP

[57]    ABSTRACT

A clutch cover assembly 1 is provided with a biasing mechanism 24 disposed between a pressure plate 22 and a fulcrum ring 23 for biasing the fulcrum ring 23 axially away from the pressure plate 23. The biasing mechanism 24 includes a first support plate 31, a second support plate 32, and return springs 33. The first and second support plates 31 and 32 are movable relative to each other in the circumferential direction. The first and second support plates 31 and 32 include first and second tilted surfaces 31a and 32a, respectively, that abut on each other. The return springs 33 are disposed in an inner circumference of the first and second support plates 31 and 32. Each return spring 33 is a tension spring which biases the first and the second support plates 31 and 32 relative to each other in the circumferential direction. Thus, clutch cover assembly 1 is equipped with a wear compensation mechanism that has a simplified biasing mechanism 24 located between the fulcrum ring 23 and the pressure plate 22.

19 Claims, 16 Drawing Sheets

CLUTCH COVER ASSEMBLY

BACKGROUND OF THE INVENTION

1. Field of the Invention

This invention generally relates to a clutch cover assembly. More specifically, the present invention relates to a clutch cover assembly, which has a wear compensation mechanism to compensate for the wear occurring in the friction members to maintain the initial pressing load.

2. Background Information

A clutch cover assembly of a clutch device is installed on a flywheel of an engine and transmits driving power of the engine to the transmission by biasing friction facings of the clutch disk assembly toward the flywheel with spring force of a diaphragm spring. In this type of clutch device, once wear of the friction facings exceeds a certain amount, the friction facings become unusable or the diaphragm spring of the clutch cover changes the angle, changing the pressing load applied by the diaphragm spring. As a result, a clutch disk assembly needs to be replaced. It is desirable to produce a clutch device that delays the replacement time for the clutch disk assembly. In other words, it is desirable to extend the life of a clutch.

To extend the life of a clutch, it is important to increase the effective thickness of friction facings of a clutch disk assembly. Therefore, friction facings are often fixedly coupled to a cushioning plate without using a rivet.

In a clutch cover assembly, when the friction facings are worn, the angle of a diaphragm spring needs to be changed back to the initial state. To accomplish this adjustment, the wear amount of the friction facings is measured and a supporting member (a fulcrum ring on the pressure plate side or a supporting mechanism on the clutch cover side) of the diaphragm spring is moved by a distance corresponding to the measured wear amount. This way, the friction facings of the clutch disk assembly can be fully utilized.

An example of a prior art clutch cover assembly, which has a wear compensation mechanism, is disclosed in the Japanese Patent Publication 6-42553. The wear compensation mechanism that is disclosed in the Japanese Patent Publication 6-42553 mainly comprises a fulcrum ring, a biasing mechanism and a regulating mechanism. The fulcrum ring is disposed between a clutch cover and a diaphragm spring. The biasing mechanism is positioned to bias the fulcrum ring away from a pressure plate. The regulating mechanism is designed to keep the fulcrum ring from moving away from the pressure plate and allow the fulcrum ring to move in the axial direction relative to the pressure plate by the wear amount when the friction facings wear.

The regulating mechanism, shown in the FIG. 3 of the Japanese Patent Publication 6-42553, includes a pair of wedge members and a spring. The wedge members are disposed between the pressure plate and the fulcrum ring, while the spring biases both of the tilted surfaces of the wedge members relative to each other in a circumferential direction. The first wedge member is fixedly coupled to the fulcrum ring. The second wedge member is disposed in a groove of the pressure plate and is movable in a circumferential direction. The spring is disposed between the first wedge member and the second wedge member and is compressed in the circumferential direction. As a result, the spring presses the first wedge member and the second wedge member in the circumferential direction biasing the tilted surfaces of the first wedge member and the second wedge member relative to each other in the circumferential direction. In this way, the second wedge member and the fulcrum ring are constantly biased in a direction to move away from the pressure plate. As the regulating mechanism allows the fulcrum ring to move, the second wedge member moves in the circumferential direction, thereby moving the first wedge member in the axial direction. As a result, the fulcrum ring is separated from the pressure plate by the wear amount of the friction facings, and the angle of the diaphragm spring returns to the initial state.

A biasing mechanism in a conventional wear compensation mechanism as described above has a spring disposed between a pressure plate and a fulcrum ring. Therefore, the space provided for accommodating a supporting structure for the spring is limited. Also, because of the spring, not much space is left for enough number or space of attaching surfaces of wedge members.

In view of the above, there exists a need for a clutch cover assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a clutch cover assembly equipped with a wear compensation mechanism that has a simplified structure located between a pressure plate which has a biasing mechanism and a fulcrum ring.

Another object of the present invention is to provide a clutch cover assembly equipped with a wear compensation mechanism in which a tension spring of a biasing mechanism is disposed in an inner circumference of a fulcrum ring and a pressure plate. This allows the structure between the pressure plate and the fulcrum ring can be simplified.

In one aspect of the present invention a clutch cover assembly is provided that engages a clutch by biasing friction facings of a clutch disk assembly toward a flywheel and includes a clutch cover, a pressure plate, a fulcrum ring, a pressing member, a biasing mechanism, and a regulating mechanism. The clutch cover is fixedly coupled to the flywheel and includes an opposing portion, which opposes the friction facings. The pressure plate is disposed adjacent to the friction facings in between the friction facings and the opposing portion. The pressure plate has a first surface that faces the friction facings and a second surface that faces the opposing portion. The fulcrum ring is disposed on the second surface side of the pressure plate. The pressing member is supported by the clutch cover and gives the fulcrum ring a pressing force toward the pressure plate. The biasing mechanism is disposed between the pressure plate and the fulcrum ring and biases the fulcrum ring axially away from the pressure plate. The biasing mechanism includes a first and a second wedge members and a tension spring. The first and the second wedge members have body portions which are movable relative to each other in a circumferential direction and tilted surfaces formed on the body portions that are attached to each other. The tension spring is disposed on an inner circumference of the first and the second wedge members and biases the wedge members relative to each other in the circumferential direction. The regulating mechanism keeps the fulcrum ring from moving axially when there is no wear in the friction facings, and measures the wear amount and allows the fulcrum ring to move axially by a distance corresponding to the wear amount when the friction facings wear.

In this clutch cover assembly, when the pressing member presses the fulcrum ring, the pressure plate is pressed toward the friction facings via the fulcrum ring. As a result, the friction facings of the clutch disk assembly are held between the flywheel and the pressure plate. This way, the clutch is engaged. When the pressing force from the pressing member is released, the pressing force from the pressure plate to the friction facings is released. As a result, the friction facings separate from the flywheel and the pressure plate. This way, the clutch is disengaged.

When the friction facings wear while the clutch is engaged, the regulating mechanism allows the fulcrum ring to move away from the pressure plate axially by a distance corresponding to the wear amount. Therefore, the first and the second wedge members move relative to each other in the circumferential direction in the biasing mechanism, pressing the fulcrum ring to move away from the pressure plate by the wear amount. As a result, the pressing member returns to the initial state and the pressing force to the pressure plate can be set as the initial pressing load.

In this clutch cover assembly, the tension spring of the biasing mechanism is disposed in an inner circumference of the first and the second wedge members. In other words, the tension spring is not in between the pressure plate and the fulcrum ring. Therefore, the structure of the first and the second wedge members disposed between the pressure plate and the fulcrum ring can be simplified.

In another aspect of the present invention, the clutch cover assembly, discussed above, further includes an annular space between the pressure plate and the fulcrum ring. The annular space is open on the inner circumferential side. The first and the second wedge members are disposed in the annular space. The tension spring is disposed in a further inner circumference of the annular space. In this clutch cover assembly, the structure of the first and the second wedge members between the pressure plate and the fulcrum ring can be simplified.

In another aspect of the present invention, the clutch cover assembly according to the features discussed above further has the body portions of the first and the second wedge members being annular in shape with each including a plurality of tilted surfaces. In this clutch cover assembly, since the body portions of the first and the second wedge members are annular, all tilted surfaces move together in the circumferential direction, thereby keeping the amount of the axial movement of the fulcrum ring the same throughout the circumference of the fulcrum ring. Therefore, the angle of the fulcrum ring can be maintained.

According to another aspect of the present invention, the clutch cover assembly according to the features discussed above further has the first and second wedge members made of sheet metal. In this clutch cover assembly, the structure can be simplified and the production cost can be lowered.

In accordance with another aspect of the present invention, the clutch cover assembly according to the features discussed above has the biasing mechanism further includes a preventing portion installed on at least one of the first and the second wedge members for preventing a radially outward deflection of the tension spring.

In this clutch cover assembly, a radially outward deflection of the tension spring is prevented by the preventing portion installed on at least one of the first and the second wedge members. As a result, ends of the tension spring are less likely to wear or break.

In another aspect of the present invention, the clutch cover assembly according to the features discussed above is designed with the preventing portion extending from the body portion. The preventing portion of the first wedge portion and the preventing portion of the second wedge portion are adapted to abut on each other in the circumferential direction when the wear amount of the friction facings becomes constant. If the first and the second wedge portions are made of sheet metal, the preventing portion is a portion of the body portion bent from the body portion, which is easy to make. Also, since the preventing portions abut on each other, a rotation of the second wedge portion beyond the abutment is prevented. In other words, the biasing mechanism stops biasing automatically once the wear amount of the friction facings reaches a predetermined amount.

In still another aspect of the present invention, the preventing portion extends in a radially inner direction from the body portion and opposes the tension spring in the radial direction. There is a gap in the radial direction between the preventing portion and the tension spring.

In this clutch cover assembly, when a centrifugal force is applied to the tension spring and the tension spring deflects in the radially outward, the tension spring attaches to the preventing portion thereby preventing further deflection. In this way, since deflection of the tension spring is prevented, the ends are less likely to wear or break.

In accordance with another aspect of the present invention, the clutch cover assembly according to the features or aspects discussed above has a biasing mechanism that further includes an engagement portion, which is installed on each of the first and second wedge members. The engagement portions form circumferential surfaces where the end portions of the tension spring are engaged.

In this clutch cover assembly, the pressure per area at the end portion of the tension spring where the tension spring engages with the engagement portion is low. Therefore, the end portion is less likely to wear or break.

According to another aspect of the present invention, the clutch cover assembly according to the features or aspect discussed above has its engagement portion being a cylindrical member whose radius is substantially the same as the radius of the end portion of the tension spring. The end portion of the tension spring is wound in an outer circumference of the engagement portion.

In this clutch cover assembly, the end portion of the tension spring can move and deform in the axial direction relative to the engagement portion. Therefore, the end portion of the tension spring is less likely to generate a stress.

In yet another aspect of the present invention, the clutch cover assembly according to features or aspects discussed above is provided with an engagement portion that is a rivet fixed to the first and the second wedge members. In this clutch cover assembly, the simple structure, which utilizes a rivet prevents wear and break at the end portion of the tension spring.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
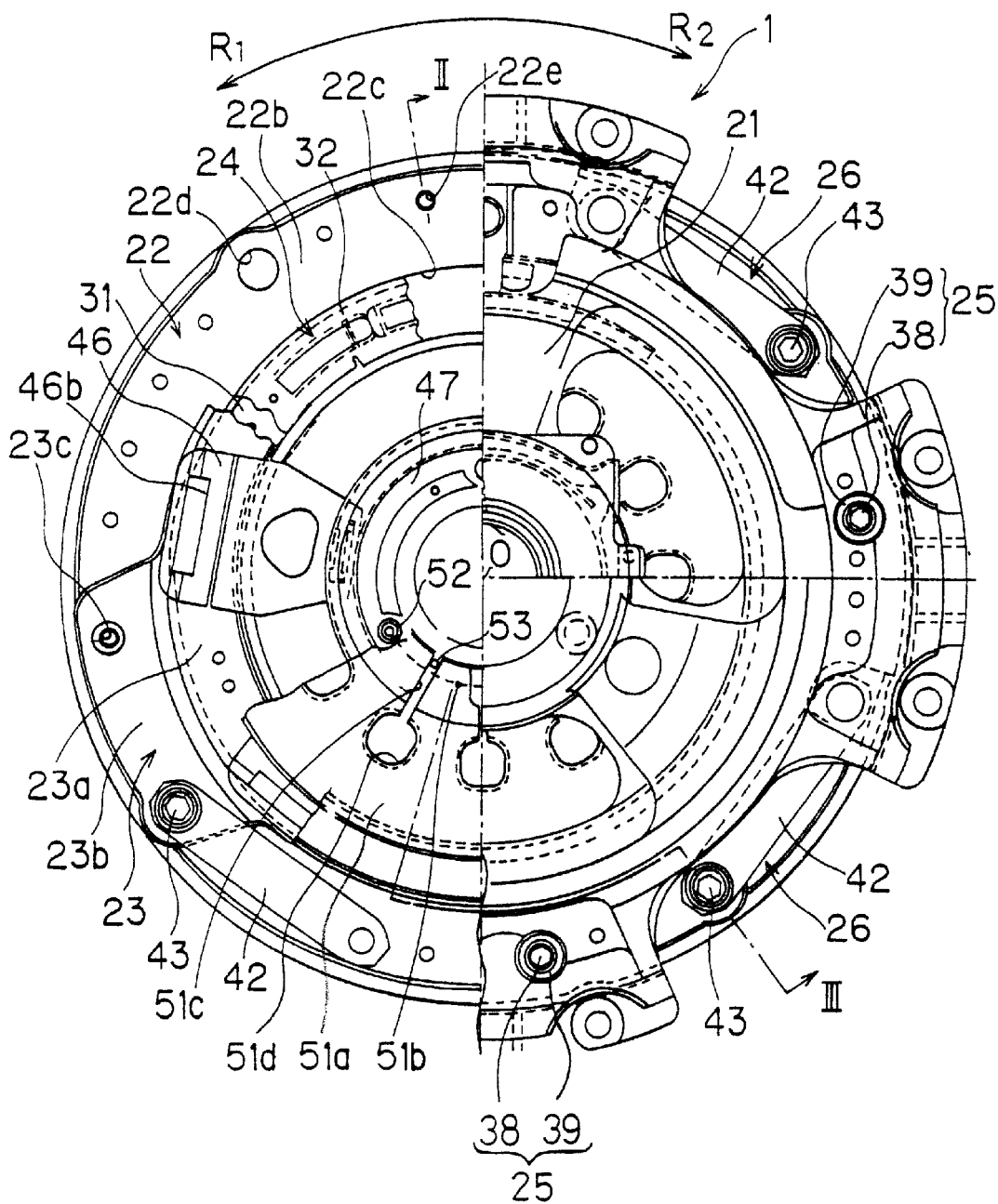
FIG. 1 is a plan view of a clutch cover assembly in accordance with a first embodiment of the present invention, with portions broken away to illustrate selected parts thereof.
Figure 2:
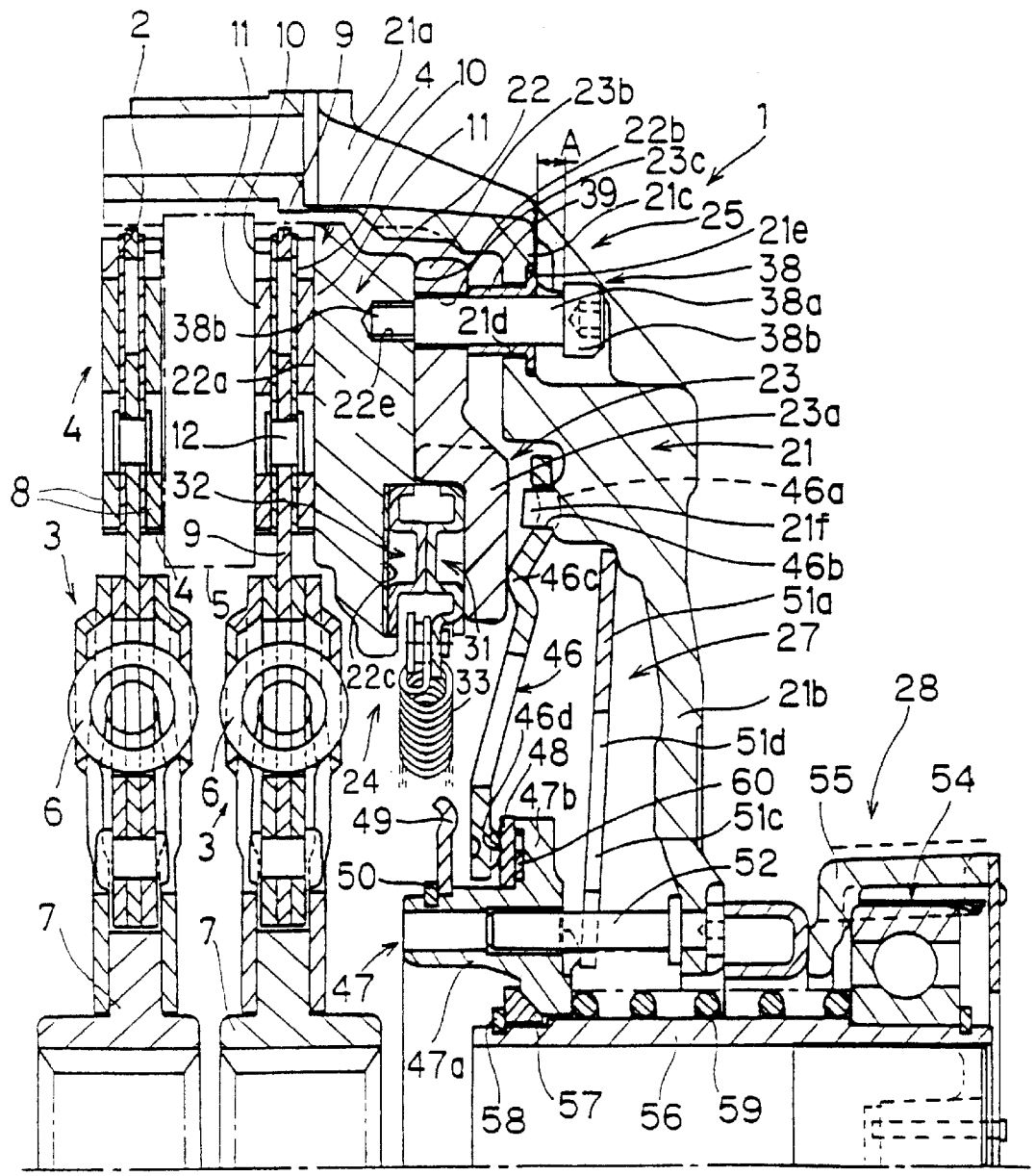
FIG. 2 is a simplified partial cross-sectional view of the clutch cover assembly illustrated in FIG. 1 in accordance with the first embodiment of the present invention as seen along section line II—II.
Figure 3:
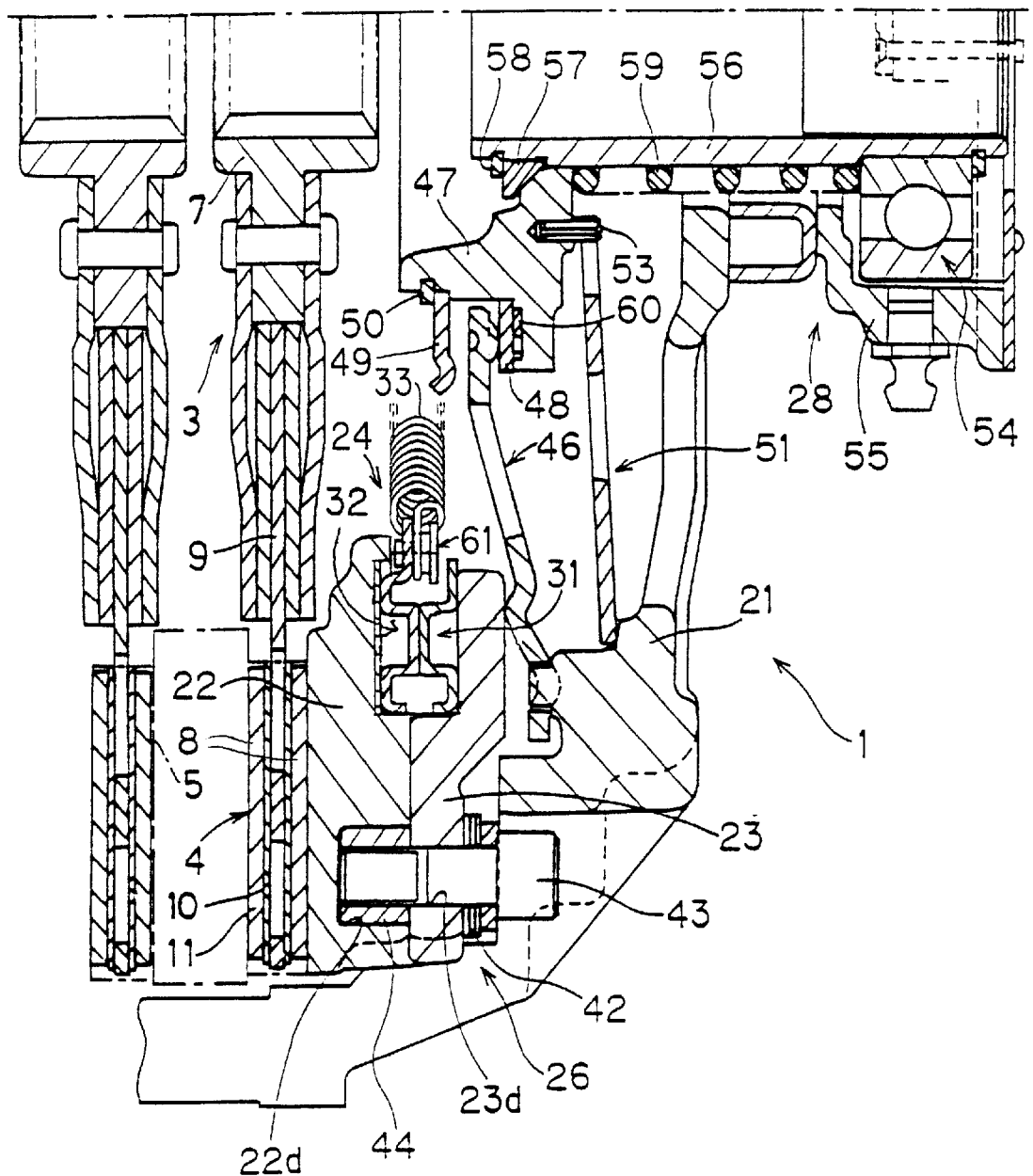
FIG. 3 is a simplified partial cross-sectional view of the clutch cover assembly invention illustrated in FIG. 1 in accordance with the first embodiment of the present as seen along section line III—III.

Referring initially to FIGS. 1, 2 and 3, a clutch cover assembly 1 is illustrated in accordance with a first embodiment of the present invention. The clutch cover assembly 1 is used for a vehicle, particularly a large vehicle such as a truck. The clutch cover assembly 1 is a clutch device that selectively transmits torque from a flywheel 2 of an engine to a clutch disk assembly 3. The clutch cover assembly 1 is fixedly coupled to the flywheel 2 for rotating therewith. The clutch device includes two clutch disk assemblies 3. An intermediate plate 5 is disposed in between friction disks 4 of the clutch disk assemblies 3. The clutch cover assembly 1 of the present invention can be applied to a clutch device, which includes only one clutch disk assembly.

The clutch disk assembly 3 includes mainly the friction disk 4 and a hub 7, which is connected to the friction disk 4 via a coil spring 6. The friction disk 4 includes a plurality of friction plates 8 fixed to both sides of an outer periphery of a disk shaped plate 9. Each friction plate 8 includes a core plate 10 which is fixed to the disk shaped plate 9 with a rivet 12, and the friction facings 11 which are fixed to the core plate 10. In this embodiment, the friction facings 11 are made of sintered ceramic-metal materials.

As shown in FIG. 1, the direction in which the clutch device rotates is represented by $R_1$. The direction in which a second support plate 32 rotates is represented by $R_2$, which is opposite $R_1$ and described below. The second support plate 32 rotates in the direction $R_2$ to adjust the wear of the friction facings 11 as described in detail below. In FIGS. 2 and 3, the engine (not shown) is disposed on the left side, and the transmission (not shown) is disposed on the right side.

Referring to FIGS. 2 and 3, the clutch cover assembly 1 includes mainly a clutch cover 21, a pressure plate 22, a fulcrum ring 23, a biasing mechanism 24, a regulating mechanism 25, a clutch pressing mechanism 27, a set of driving mechanisms 26, and a releasing device 28.

The clutch cover 21 is a dish shaped member fixedly coupled to the flywheel 2. The clutch cover 21 includes an outer peripheral covering portion 21a which covers an outer circumferential side of the clutch disk assembly 3, and a disk shaped portion 21b which faces the transmission side of the clutch disk assembly 3. An annular opposing portion 21c that faces the friction disk 4 in an axial direction is formed on an outer circumference of the disk shaped member 21b. Four first axial holes 21d are formed at equal intervals on the opposing portion 21c (outer peripheral portion of the disk shaped portion 21b). A concave hollow 21e is formed on the transmission side of the first axial hole 21d. The concave hollow 21e has a larger diameter than the first axial hole 21d.

The pressure plate 22 is disposed inside the outer peripheral covering member 21a of the clutch cover 21, between the friction disk 4 and the opposing portion 21c of the clutch cover 21 adjacent to the friction disk 4. The pressure plate 22 is an annular member made of such material as cast iron. The pressure plate 22 includes a first friction face 22a (a first surface) facing the friction disk 4 and a second friction surface 22b facing the opposing portion 21c. A channel 22c extending in the circumferential direction is formed in the inner peripheral side of the second friction surface 22b of the pressure plate 22. The biasing mechanism 24 (described in greater detail below) is installed in the channel 22c. Four blind bores 22d are formed at equal intervals in a circumferential direction in an outer circumferential portion of the second friction surface 22b of the pressure plate 22. Four tapped holes 22e are formed in pressure plate 22. Holes 22c are located on the $R_2$ direction side of each of the blind bores 22d.

The fulcrum ring 23 is disposed on the second surface 22b side of the pressure plate 22. The fulcrum ring 23 moves toward the flywheel 2 together with the pressure plate 22, upon receiving a load from one of the a lever members 46. The fulcrum ring 23 includes an annular portion 23a, and three projection portions 23b extending from the annular portion 23a in a radially outer direction. The annular portions 23a are located facing the channel 22c of the pressure plate 22 at a predetermined axial interval. The projection portion 23b abuts on the second surface 22b of the pressure plate 22. As shown in FIGS. 1–3, each of the projection portions 23b extends circumferentially within a predetermined angular range, a second axial hole 23c is formed in each of the projection portions 23b on the $R_2$ direction end, and a third axial hole 23d is formed on the $R_1$ direction end. The second axial hole 23c and the third axial hole 23d of each of the projection portions 23b correspond to one of the tapped holes 22e and one of the blind bores 22d of the pressure plate 22 respectively. The second axial holes 23c also correspond to the first axial holes 21d, and have a smaller radius than the first axial holes 21d.

The fulcrum ring 23 and the pressure plate 22 are coupled to rotate with the clutch cover 21, and therefore with the flywheel 2 because of the driving mechanisms 26. Four of the driving mechanisms 26 are installed circumferentially spaced apart. Each driving mechanism 26 includes a strap plate 42, a bolt 43 and a block 44. The strap plates 42 connect the fulcrum ring 23 with the clutch cover 21 in a non-rotatable manner, but allows for movement in the axial direction. The strap plates 42 are elastic plate members that extend in the circumferential direction (roughly tangential direction). Each of the strap plates 42 preferably includes three plate members adjacent to each other. The ends in the $R_1$ direction of the strap plates 42 are fixedly coupled to the clutch cover 21. The ends in the $R_2$ direction of the strap plates 42 are fixedly coupled to the fulcrum ring 23 with bolts 43. The bolts 43 pass through the third axial holes 23d of the fulcrum ring 23 with the ends of the bolts 43 being threaded into the blocks 44. The ends in the $R_2$ direction of the strap plates 42 are held between the projection portions 23b and the heads of the bolts 43. The blocks 44 are inserted in the blind bores 22d of the pressure plate 22. The blocks 44 are movable against the blind bores 22d from the position shown in FIG. 3 toward the transmission. The blocks 44 connect the fulcrum ring 23 and the pressure plate 22 in a non-rotatable manner, but allows for movement in the axial direction relative to each other.

Figure 6:
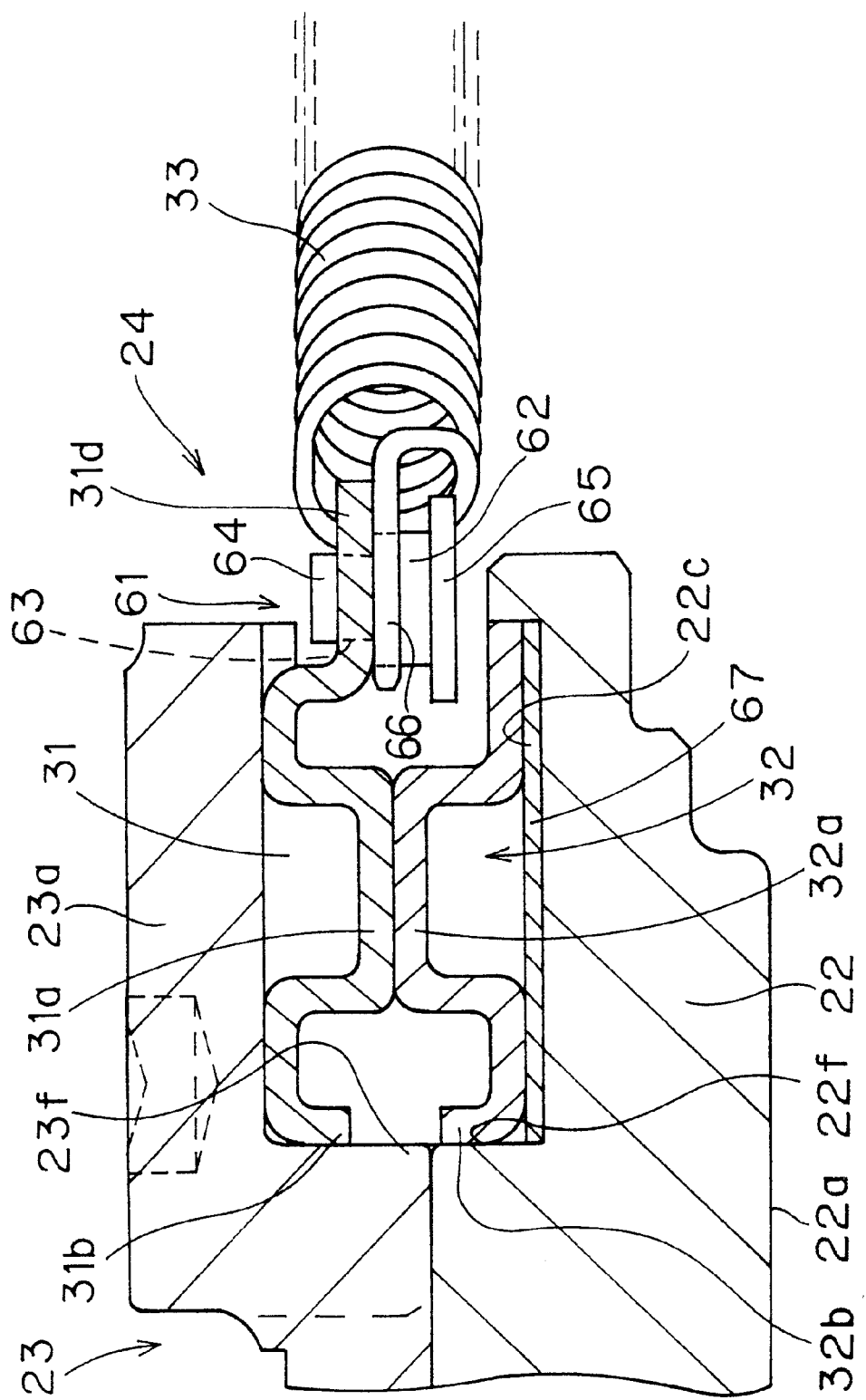
FIG. 6 is an enlarged, partial a cross-sectional view of the biasing mechanism utilized in the clutch assembly in accordance with the first embodiment of the present invention illustrated in FIGS. 1 through 3.

As shown in FIG. 6, most of the members in the biasing mechanism 24 are disposed in an annular space formed between the channel 22c of the pressure plate 22 and the annular portion 23a of the fulcrum ring 23. The annular space is formed in between the annular portion 23a which projects radially inward from the transmission side of the outer periphery 23f of the fulcrum ring 23 and another annular portion which projects radially inward from the engine side of the outer periphery 22f of the pressure plate 22. As a result, the outer peripheral side of the annular space is closed with the outer periphery 22f of the pressure plate and the outer periphery 23f of the fulcrum ring 23, and the both axial sides are closed with an inner peripheral portion of the pressure plate 22 and the annular portion 23a of the fulcrum ring 23 respectively. The inner peripheral side of the annular space is open and therefore the annular space is connected to outside.

The biasing mechanism 24 biases the fulcrum ring 23 away from the pressure plate 22 (toward the transmission). The biasing mechanism 24 includes mainly a first support plate 31, a second support plate 32, and a plurality of return springs 33.

The first and the second support plates 31 and 32 are annular sheet metal members. As shown in FIG. 6 in detail, the first and the second support plates 31 and 32 are annularly disposed between the annular portion 23a of the fulcrum ring 23 and the annular groove 22c which is in an inner circumference of the pressure plate 22. The first plate 31 is disposed close to the fulcrum ring 23 and adjacent to the annular portion 23a. The second plate 32 is disposed close to the pressure plate 22 and adjacent to the groove 22c (a friction plate 67 in this embodiment). The radial width of the second plate 32 is the same as the radial width of the groove 22c. Therefore, the second plate 32 is movable only in the circumferential direction relative to the groove 22c. A plurality of first and second tilted surfaces 31a and 32a, which extends a predetermined distance in the circumferential direction, is formed on annular body portions of the first and the second support plates 31 and 32, respectively. The first and the second tilted surfaces 31a and 32a are formed on a radially intermediate position of the first and the second support plates 31 and 32 respectively. As shown in the FIG. 11, the first tilted surface 31a of the first support plate 31 is higher at the $R_2$ end (projecting toward the engine), and lower at the $R_1$ end. Preferably, the tilting angle of the first and second tilted surfaces 31a and 32a (the angle between the tilted surfaces 31a and 32a, and the groove 22c) should be in the range between ten degrees and fifteen degrees. More preferably, the tilting angle of the first and second tilted surfaces 31a and 32a are in the range between twelve degrees and fourteen degrees. In the initial state, where there is no wear in the friction facings 11, the first support plate 31 and the second support plate 32 are in a position shown in the FIG. 11. That is, the first tilted surface 31a and the second tilted surface 32a abut on each other along the whole surface. The first tilted surface 31a and the second tilted surface 32a comprise a wedge structure, which compensates for wear in the friction facings 11. Since the shapes of the first and the second support plates 31 and 32 are the same, a pair of support plates 31 and 32 can be made by making only one kind of support plate.

In this embodiment, the first and the second tilted surfaces 31a and 32a are formed along the whole circumference of the first and second support plates 31 and 32. Therefore, the first and second support plates 31 and 32 have more wedge structures than in conventional structure. As a result, the pressure per area at the abutting portion of the tilted surfaces 31a and 32a is smaller than in the prior art.

Outer peripheral cylindrical portions 31b and 32b that are bent axially are formed on the outer circumferential side of the first and the second support plates 31 and 32. The cylindrical portion 31b of the second support plate 31 abuts on an outer circumferential wall 23f of the fulcrum ring 23. The cylindrical portion 32b of the second support plate 32 abuts on an outer circumferential wall 22f of the pressure plate 22. The first support plate 31 is fixedly coupled to the annular portion 23a of the fulcrum ring 23 with a plurality of rivets (not shown).

Figure 7:
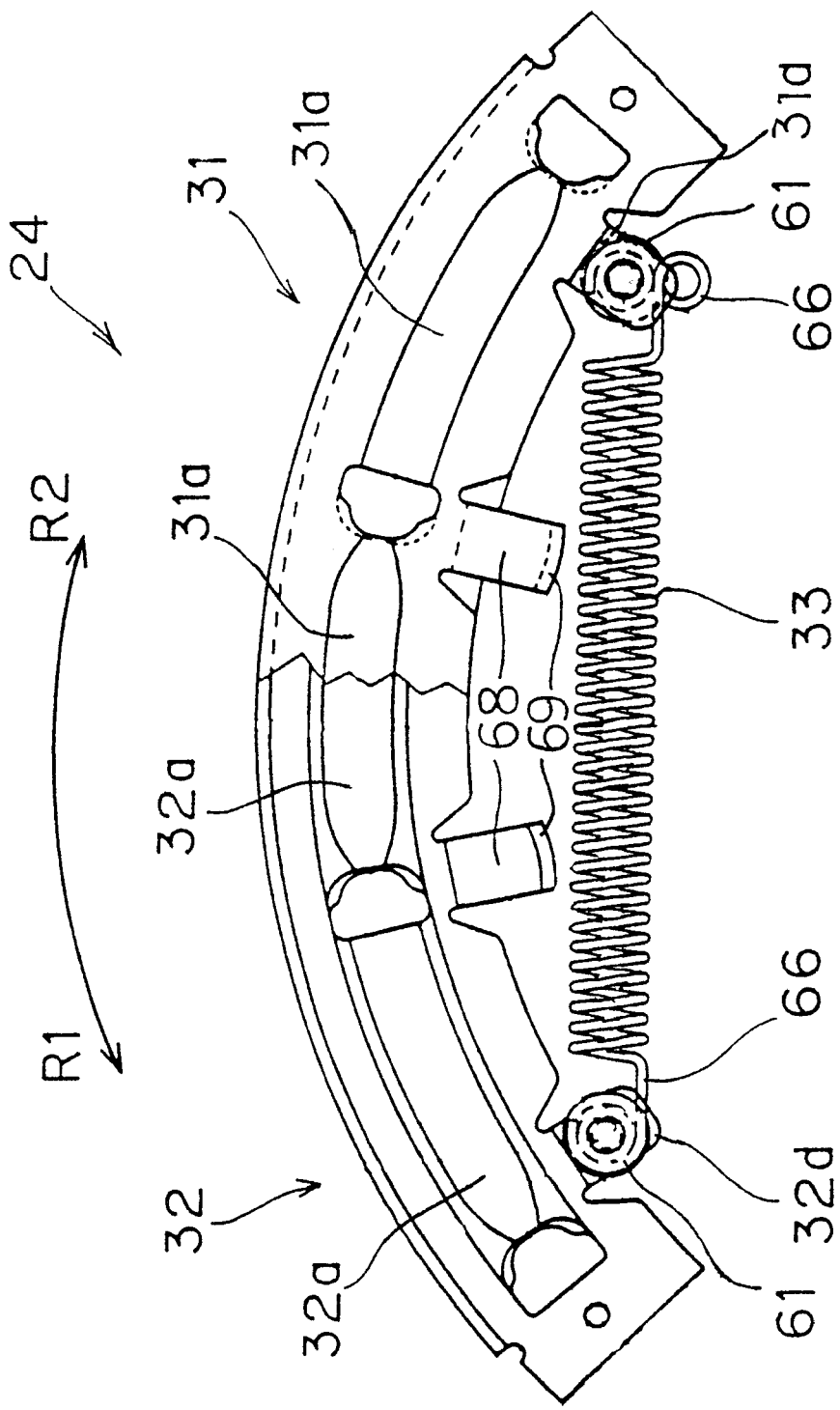
FIG. 7 is a plan view of the biasing mechanism utilized in the clutch cover assembly in accordance with the first embodiment of the present invention illustrated in FIGS. 1 through 3 and 6.

As seen in FIGS. 6 and 7, a plurality of spring connecting portions 31d and 32d is formed on the inner circumferential sides of the first and the second support plates 31 and 32, respectively. The connecting portions 31d and 32d project from the annual space and extend in the radially inner direction. The spring connecting portion 31d and the spring connecting portion 32d are disposed alternately in the circumferential direction. Rivets 61 are fixed on the spring connecting portions 31d and 32d. Each of the rivets 61 includes a cylindrical body portion 62, a cylindrical end portion 63 extending from the body portion 62 toward the spring connecting portions 31d and 32d, a first head portion 64 formed on the end portion 63 on the opposite side from the spring connecting portions 31d and 32d, and a second head portion 65 formed on the body portion 62 on the opposite side from the portion 63. The spring connecting portions 31d and 32d are held between the body portions 62 of the rivets 61 and the first head portions 64 of the rivets 61. The body portions 62 are cylindrical or ring-shaped members with its central line extending parallel to the axis O—O of the clutch cover assembly 1, and include an outer peripheral surface.

The return springs 33 are tension coil springs that bias the first support plate 31 and the fulcrum ring 23 away from the pressure plate 22 in the axial direction by biasing the first support plate 31 and the second support plate 32 in the circumferential direction. In other words, the return springs 33 bias the first support plate 31 and the fulcrum ring 23 away from the pressure plate 22 by biasing the first tilted surface 31a and the second tilted surface 32a relative to each other.

Each of the return springs 33 has a curved end portion 66 that is secured to one of the body portions 62 of one of the rivets 61. In particular, the curved end portions 66 of the return springs 33 wind around the body portions 62 of the rivets 61 in the circumferential direction to secure both ends of the returning springs 33 between the first support plate 31 and the second support plate 32. The radius of each of the end portions 66 is almost the same as the radius of each of the body portions 62 of the rivets 61.

Figure 8:
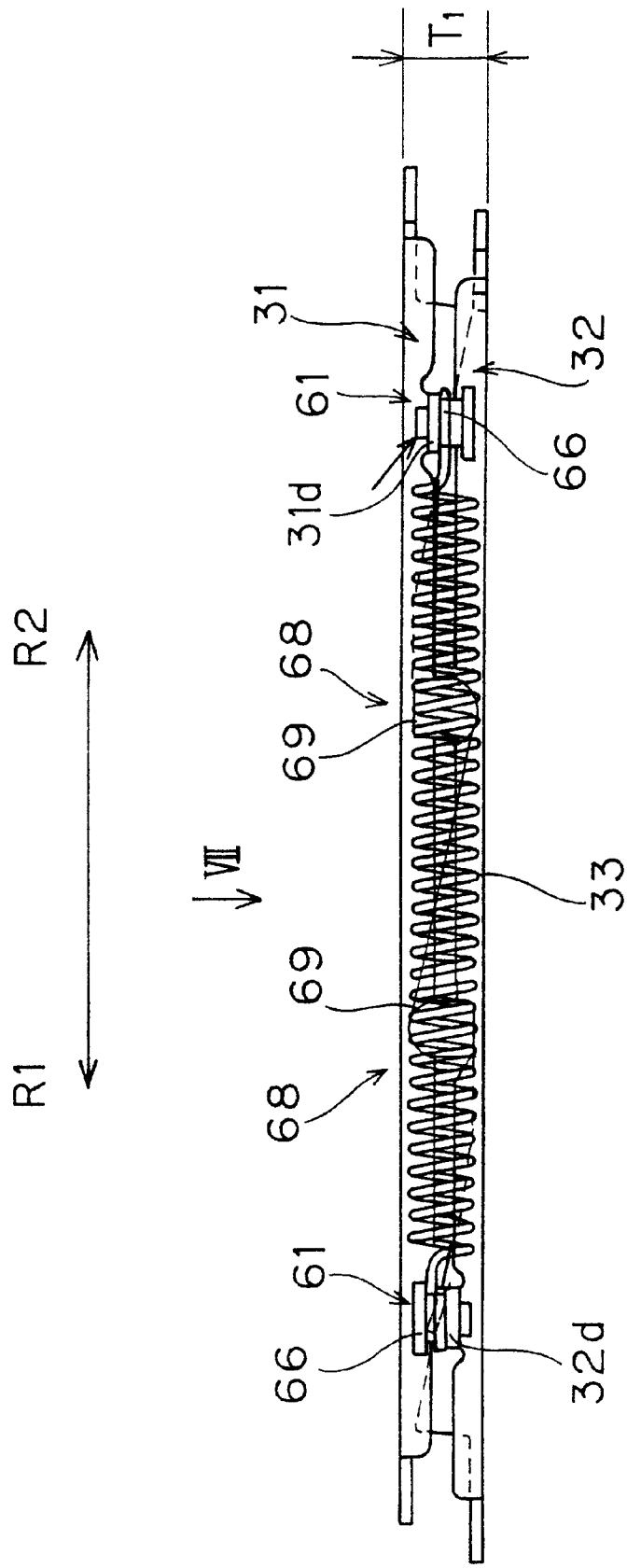
FIG. 8 is a side elevational view of the biasing mechanism utilized in the clutch cover assembly in accordance with the first embodiment of the present invention illustrated in FIGS. 1 through 3 and 6.

As shown in the FIG. 8, at the spring connecting portions 31d of the first support plate 31, the end portions 66 of the return springs 33 wind around closer to the transmission relative to the body portion 62 of the rivet 61 (FIG. 6). At the spring connecting portion 32d of the second support plate 32d on the other hand, the end portions 66 of the return spring wind around closer to the engine relative to the body portion 62. The end portion 66 is movable and deformable in the axial direction. In other words, the end portions 66 are moveable and deformable in between the spring connecting portions 31d and 32d and the second head portion 65.

As shown in the FIG. 7, the return springs 33 are on an inner circumferential side of the first and the second support plates 31 and 32. In other words, the return springs 33 are located at a further inner circumference of the pressure plate 22 and the fulcrum ring 23. The return springs 33 are installed under tension between the spring connecting portions 31d and 32d. The return springs 33 bias the first support plate 31 in the $R_1$ direction relative to the second support plate 32 and the second support plate 32 in the $R_2$ direction relative to the first support plate 32. As a result, when the fulcrum ring 23 and the first support plate 31 become movable in the axial direction, the second support plate 32 starts to rotate in the $R_2$ direction, and the second tilted surface 32a slides under the engine side of the first tilted surface 31a and pushes up the first support plate 31 to move away from the pressure plate 22.

The biasing mechanism 24 is disposed in an inner periphery of the pressure plate 22. Since the inner peripheral side of the annular space is open, the operation of the biasing mechanism 24 is easy. For example, it is easy to install or remove the return spring 33.

Since the first and second support plates 31 and 32 are made of sheet metal formed by presswork and the cost of producing the first and second support plates 31 and 32 is low since a plurality of the tilted surfaces 31a and 31b is formed simultaneously, this also reduces the cost of production of the first and second support plates 31 and 32. Since the spring connecting members 31d and 32d that connect with the return spring 33 are formed on the first and the second plates 31 and 32 respectively, the whole structure is simple. Since the tilted surfaces 31a and 32a are formed into an annular member, the amount of movement of the second tilted surface 32a in the circumferential direction is constant. As a result, the amount of projection of the fulcrum ring 23 in the axial direction is kept constant throughout the circumference of the fulcrum ring 23.

Since the return spring 33 is disposed in a further radially inner side of the annular space defined by the pressure plate 22 and the fulcrum ring 23, (in other words, the return spring 33 is not disposed between the pressure plate 22 and the fulcrum ring 23), the following merits are obtained. First, the length of the return spring 33 can be extended. Therefore the designing will be easier. Second, replacement of the return spring 33 will be easier. Third, since there is no need to dispose a spring between the pressure plate 22 and the fulcrum ring 23, the structure of the portion between the pressure plate 22 and the fulcrum ring 23 can be simplified. When a spring is disposed between these members, there needs to be a structure to connect both ends of the spring within the annular space, which makes the structure complicated. Fourth, the first and the second tilted surfaces 31a and 32a can be formed on the first and the second support plates 31 and 32 throughout the circumference. Therefore, there are more of the first and the second tilted surfaces 31a and 32a. As a result, the pressure per area at the abutting surface of a wedge structure defined by the first and the second tilted surfaces 31a and 32a can be lowered. In this way, wear and breakage at the first and the second tilted surfaces 31a and 32a can be substantially prevented.

As shown in FIG. 7, several stays 68 (preventing portion) are formed on each of the first and the second support plates 31 and 32. The stays 68 project radially inwardly from each of the first and the second support plates 31 and 32. The stays 68 prevent a radially outward deflection of the return springs 33. The stays 68 formed on the first support plate 31 are installed on the $R_1$ sides of the spring connecting portions 31d. The stays 68 formed on the second support plate 32 are installed on the $R_2$ sides of the spring connecting portions 32d and on the $R_1$ sides of the stays 68 formed on the first support plate 31. In this way, for each return spring 33, there are always two stays, i.e., one stay 68 of the second support plate 32 for the $R_1$ direction and one stay 68 of the first support plate 31 for the $R_2$ direction.

Each of the stays 68 is made of sheet metal, extends from the inner periphery of the first and the second support plates 31 and 32, and includes an abutting portion 69 extending in an axial direction from the radially inner side. The radially inner side of the abutting portion 69 is curved smoothly. The abutting portions 69 of the first support plate 31 extend toward the engine and the abutting portions 69 of the second support plate 32 extend toward the transmission. Each of the abutting portions 69 is disposed on the same axial position as one of the return springs 33 and on the outer peripheral side of the return spring 33. There is a small gap between the abutting portion 69 and the return spring 33 in the radial direction. Two stays 68 which correspond to each return spring 33 are disposed such that the stays 68 can abut on each other and do abut on each other in the circumferential direction when wear of the friction facings 11 increases to a constant amount as described later.

As seen in FIG. 6, a friction plate 67 is disposed between the groove 22c of pressure plate 22 and the second support plate 32. The friction plate 67 is an annular friction lining and has a higher friction coefficient than the pressure plate 22 or the second support plate 32. Preferably, the friction plate 67 should have good resistance to wear and heat. An example of the friction plate 67 is a product named NAH44, which is produced by Nihon Valqua Industries, Ltd. The friction plate 67 can be fixedly coupled either to the groove 22c of the pressure plate 22 or to the second support plate 32. The friction plate 67 is preferably made of a plurality of arch-shaped plates. In stead of the friction plate 67, a friction material can be coated on one or both of the engine side of the second support plate 32 and the groove 22c of the pressure plate 22 to increase the friction coefficient.

Due to the friction plate 67 or the friction material, an under adjustment is less likely to happen even under the condition with many vibrations. An under adjustment refers to a phenomenon that happens while the clutch is engaged, in which the second support plate 32 slides in the $R_1$ direction (the opposite direction from the direction that the second support plate 32 slides to compensate the wear) as the axial force from the first support plate 31 to the second support plate 32 increases due to vibrations thereby increasing the circumferential force applied to the second support plate 32. When this happens, the axial height of the first support plate 31 becomes lower and the location of the fulcrum ring 23 does not correspond to the wear amount.

Another way to prevent the under adjustment phenomenon from occurring is to make the tilting angles of the first and the second tilted surfaces 31a and 32a smaller. In this case, a circumferential element of the axial force acting from the first tilted surface 31a on the second tilted surface 32a becomes small. However, making the angle too small creates several problems that make it difficult to actually use the wedge mechanism with a small angle. First, a phenomenon referred to as over adjustment, in which the second support plate 32 rotates in the $R_2$ direction too much, thereby moving the fulcrum ring 23 in the axial direction beyond the wear amount. This can result in disengagement of the clutch. Secondly, the rotating angle of the second support plate 32 becomes larger for the same amount of wear. As a result, the biasing load of the return spring 33 decreases dramatically, which is not desirable. It is also difficult to make a return spring that prevents such decrease in the biasing load.

The present invention prevents an under adjustment phenomenon from occurring without making the tilting angle of the tilted surfaces 31a and 32a too small. The present invention also adjusts the slipperiness of the second support plate 32 with a simple method such as coating the relevant surfaces with a friction material.

The regulating mechanism 25 prevents the fulcrum ring 23 from moving in the axial direction when the friction facings 11 are not worn. However, the regulating mechanism 25 detects the amount of wear and allows the fulcrum ring 23 to move in the axial direction by a distance corresponding to the wear amount when the friction facings 11 are worn. The regulating mechanisms 25 are disposed at four locations at equal intervals in the circumferential direction, which correspond to the locations of the tapped holes 22e of the pressure plate 22 and the locations of the second axial holes 23c of the fulcrum ring 23. Each regulating mechanism 25 includes a bolt (a first member) 38 and a bushing (a second member) 39. Thus, the regulating mechanism 25 has a simple structure comprising two members.

The bolt 38 includes a main body 38a, a screw member 38b formed at the end of the main body 38a, and the head portion 38c. The screw member 38b is threaded into the tapped hole 22e of the pressure plate 22. In this way, each bolt 38 is fixedly coupled to the pressure plate 22. The main body 38a of each bolt 38 passes through one of the second axial holes 23c of the fulcrum ring 23 and one of the first axial holes 21d of the clutch cover 21. There is a space between the main body 38a and the first axial hole 21d and between the main body 38a and the second axial hole 23c. The head portion 38c is disposed on the transmission side of the opposing member 21c of the clutch cover 21 with a space in between. The first member fixed to the pressure plate 22 does not have to be a bolt, and can be other stick shaped member such as a pin.

Figure 4:
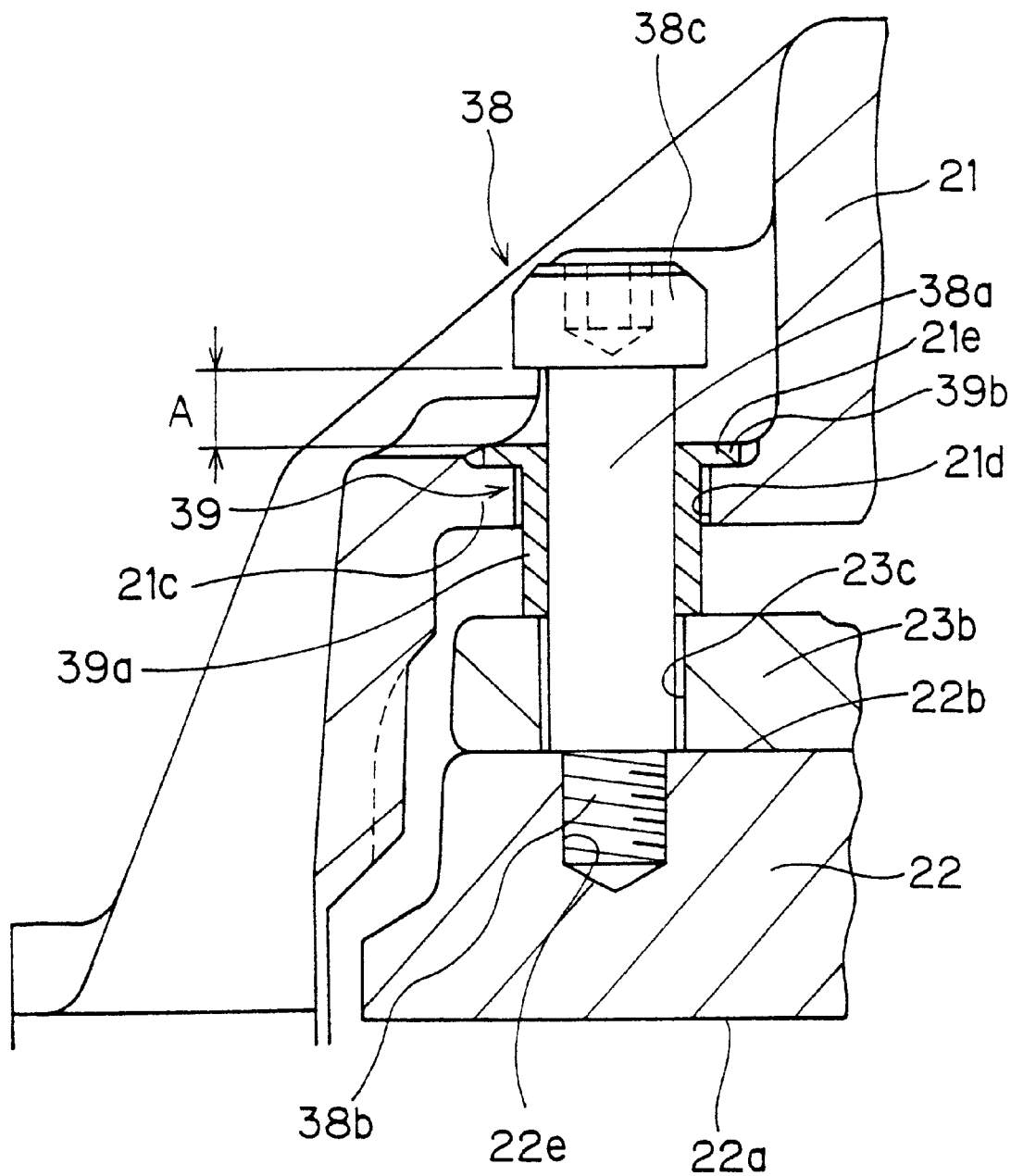
FIG. 4 is an enlarged, partial cross-sectional view an adjusting portion utilized in the clutch cover assembly illustrated in FIGS. 1 and 2 in accordance with the first embodiment of the present invention.
Figure 5:
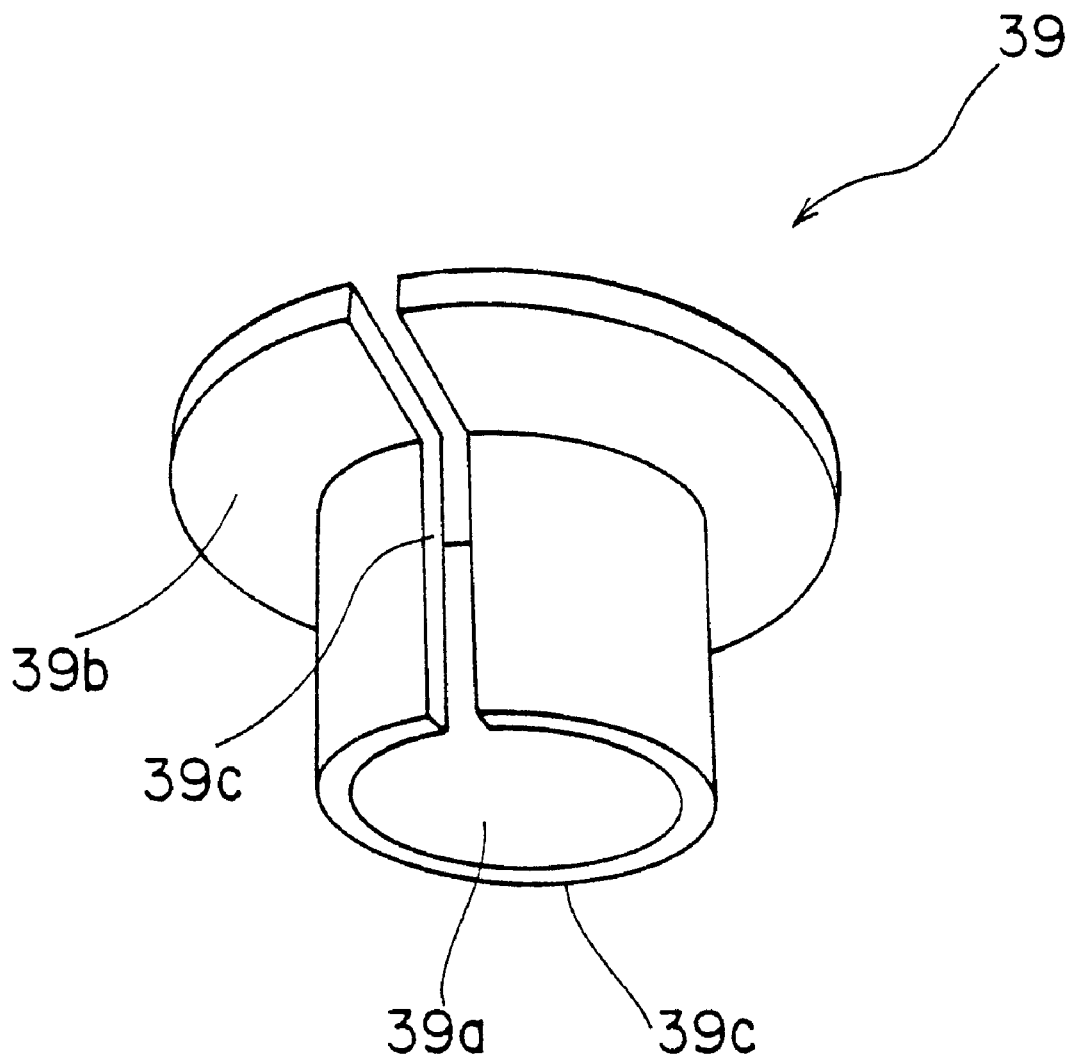
FIG. 5 is a perspective view of the biasing mechanism utilized in the clutch assembly in accordance with the first embodiment of the present invention illustrated in FIGS. 1, 2 and 4.

As shown in FIG. 5, the bushing 39 is a tubular member that is elastically deformable in a radial direction. The bushing 39 includes a tube portion 39a and a disk shaped flange 39b, which extends to an outer circumferential side from an end of the tube portion 39a. A slit 39c extending axially is formed on the tube portion 39a and the flange 39b. The bushing 39, as shown in FIG. 4, is installed on the outer periphery of the main body 38a of the bolt 38, inside the first axial hole 21d of the opposing member 21c of the clutch cover 21. The bushing 39 is set firmly around the main body 38a. One end of the tube portion 39a abuts on the engine side surface of the projection portion 23b of the fulcrum ring 23. There is a space between the outer peripheral surface of the tube portion 39a and the first axial hole 21d of the clutch cover 21. The flange 39b is disposed abutting on the bottom of a concave portion 21e of the opposing member 21c. The axial space A between the flange 39b and the head portion 38c of the bolt 38 is substantially the same as or greater than the wear amount of the friction facings 11. The bushing 39 is an elastic tubular member with a slit 39c. Thus, the bushing 39 easily bends and deforms with deflection. Therefore, the sliding resistance between the bushing 39 and the bolt 38 is stable.

Referring to FIGS. 1–3, the clutch pressing mechanism 27 presses the pressure plate 22 via the fulcrum ring 23 toward the flywheel 2. The clutch pressing mechanism 27 includes three lever members 46 (pressing member), a retainer 47, a plate 48, an abutting plate 49, a snap ring 50, a diaphragm spring 51, three pins 52, and three split pins 53.

The retainer 47 is an annular member installed on the outer periphery of the input shaft (not shown) of the transmission. The retainer 47 engages with a release device 28, which is described below. The retainer 47 mainly includes a cylindrical main body 47a and a flange 47b that extends from the transmission side end of the main body 47a to the outer circumferential direction. The retainer 47 engages with the pin 52, which is fixedly coupled to the inner peripheral portion of the disk shaped member 21b of the clutch cover 21, such that the retainer 47 is not rotatable but axially movable relative the pins 52.

The diaphragm spring 51 is generally a disk shaped member. The diaphragm spring 51 has an annular elastic member or portion 51a at the outer periphery and a plurality of lever elements or portions 51b extending toward the inner periphery from the elastic member 51a. A central hole with a large diameter is formed at the center of the diaphragm spring 51. A plurality of slits 51c extending radially outward is formed at the inner circumferential edge of the central hole. Oval holes 51d, which are wider in the circumferential direction than the slits 51c, are formed at the radial outer edge of the slits 51c. In other words, oval holes 51d are located at the outer edge of the lever portions 51b. The clutch cover 21 supports the outer peripheral portion (elastic member 51c) of the diaphragm spring 51. The inner peripheral edge (lever portions 51b) of the diaphragm spring 51 applies a predetermined pressure to the retainer 47, thereby biasing the retainer 47 toward the engine. The split pins 53 are fixedly coupled to the retainer 47, and are inserted in between the lever portions 51b of the diaphragm spring 51 in the circumferential direction at a plurality of locations. This way, the diaphragm spring 51 rotates with the retainer 47.

The lever members 46 transmit the pressing force from the diaphragm spring 51 to the fulcrum ring 23, multiplying the pressing force by the lever ratio. The lever members 46 are disposed radially at equal intervals in the circumferential direction. Each lever member 46 is formed, for example, by bending a rectangular plate member. The radially outer portion of the lever member 46 is bent so as to project toward the transmission. A hole 46b is formed at a radially outer portion of each of the lever members 46. Holes 46b extend in generally circumferential directions as seen in FIG. 1. As shown in FIG. 2, connecting projection portions 21f extend from the clutch cover 21 and engage the holes 46b. In this way, the lever members 46 rotate with the clutch cover 21. Furthermore, both circumferential sides of the hole 46b function as a fulcrum 46a which abuts on the clutch cover 21 so as to be able to oscillate. An attaching point 46c projects toward the engine and abuts on the annular portion 23a of the fulcrum ring 23. Attaching point 46c is formed at a radially outer location on each of the lever members 46. A forcing point 46d is formed at a radially inner location on each of the lever members 46 and projects toward the transmission. The forcing point 46d is disposed on the flange 47b of the retainer 47 close to the transmission.

A cone spring 60 and a plate 48 are disposed between the flange 47b and the forcing points 46d of the lever members 46. While the clutch is engaged as shown in FIGS. 2 and 3, the cone spring 60 is flat, pressed between the flange 47b and the forcing points 46d of the lever members 46. The forcing points 46d of the lever members 46 abut on the engine side of the disk shaped plate 48. An abutting plate 49 is fixedly coupled to the main body 47a of the retainer 47 at an outer circumference on the transmission side with a snap ring 50. The outer peripheral portion of the abutting plate 49 forms a bent portion projecting toward the transmission. In the state shown in FIG. 2 where the clutch is engaged, there is always a predetermined amount of space in between the bent portion and the lever members 46 in the axial direction.

The release device 28 releases the clutch by releasing the pressing force from the clutch pressing mechanism 27 toward the pressure plate 22. The release device 28 includes a release bearing 54, a quill 55, a cylindrical member 56, a supporting ring 57, a snap ring 58, and a coil spring 59. The release bearing 54 includes an inner race, an outer race and a plurality of rolling elements disposed between the inner and outer races. The quill 55 is disposed on the outer periphery of the release bearing 54, and is fixed to the outer race so as not to rotate relative to each other. The cylindrical member 56 is fixedly coupled to the inner race. The other end of the cylindrical member 56 is disposed on the inner peripheral side of the retainer 47. The supporting ring 57 is fixedly coupled to the cylinder member 56 by the snap ring 58. The snap ring 58 is located in a groove of the cylinder member 56 for fixedly coupling the supporting ring 57 to the outer peripheral end of the cylinder member 56. The supporting ring 57 abuts on the inner circumferential portion of the retainer 47 on the engine side. The abutting surface between the supporting ring 57 and the retainer 47 is a spherical surface, which is able to absorb any miss alignment therebetween. The coil spring 59 is disposed on an outer circumference of the cylinder member 56. The coil spring 59 is disposed being pressed between the inner race and the retainer 47.

OPERATION OF THE FIRST EMBODIMENT

While the clutch device is engaged as shown in FIGS. 2–4, the diaphragm spring 51 biases the retainer 47 toward the engine, which in turn causes the retainer 47 to bias the fulcrum ring 23 toward the engine via the lever members 46. As a result, the friction disk 4 and the intermediate plate 5 of the clutch disk assembly 3 are held between the pressure plate 22 and the flywheel 2. In this way, the clutch device is engaged.

When the distance between the forcing points 46d and the fulcrums 46a of the lever members 46 is E and the distance between the attaching points 46c and the fulcrums 46a is F, the lever ratio of the lever members 46 is E/F. In other words, the pressing force from the diaphragm spring 51 is multiplied by E/F before being transmitted to the fulcrum ring 23. Therefore, the pressing force of the diaphragm spring 51 can be set to be small. The cone spring 60 functions as a cushioning plate during engagement of the clutch device.

In disengaging the clutch device, the quill 55 is moved toward the transmission, which causes the release bearing 54, the cylinder member 56 and the retainer 47 to move toward the transmission. After the bent portion of the abutting plate 49 abuts against the lever members 46, the lever members 46 are moved toward the transmission. Since the distance between a portion of the lever members 46 where the abutting plate 49 abuts on and the attaching portions of the lever members 46 is shorter than the distance between the forcing points 46d and the attaching points 46c, the attaching points 46c moves away from the fulcrum ring 23 quickly. Therefore, the clutch device disengages smoothly.

Since the pressing force of the diaphragm spring 51 is set small, the load that the diaphragm spring 51 applies to the retainer 47 in disengaging the clutch device is small. As a result, the load to release the clutch device is small. In addition, since the cone spring 60 applies a load to the retainer 47 in the direction in which the retainer 47 moves (toward the transmission), the load to release the clutch becomes even smaller. Therefore, the necessary force to press a clutch pedal decreases greatly.

When the attaching points 46c of the lever members 46 move away from the fulcrum ring 23, the fulcrum ring 23 moves toward the transmission by the biasing force of the strap plate 42. At the same time, the pressure plate 22 moves together with the fulcrum ring 23 in the axial direction. This happens because the sliding resistance between each bolt 38 and each bushing 39 is set to be greater than the sum of the reaction of the strap plate 42 and the biasing force of the biasing mechanism 24. Therefore, the bolts 38 do not slide against the bushing 39. In other words, the fulcrum ring 23 moves the pressure plate 22 in the axial direction via the regulating mechanism 25. As a result, the pressing force from the pressure plate 22 toward the friction disk 4 of the clutch disk assembly 3 is released.

Preferably, the sliding resistance between the bolts 38 and the bushings 39 should be larger than, most preferably more than twice as the sum of the reaction of the strap plate 42 and the biasing force of the biasing mechanism 24. Under this setting, as vibration is transmitted from the flywheel 2 to the pressure plate 22, the bolts 38 do not slide against the bushings 39 thereby causing deflection in the strap plate 42. In this way, the accuracy of the amount of wear compensation is maintained.

Figure 10:
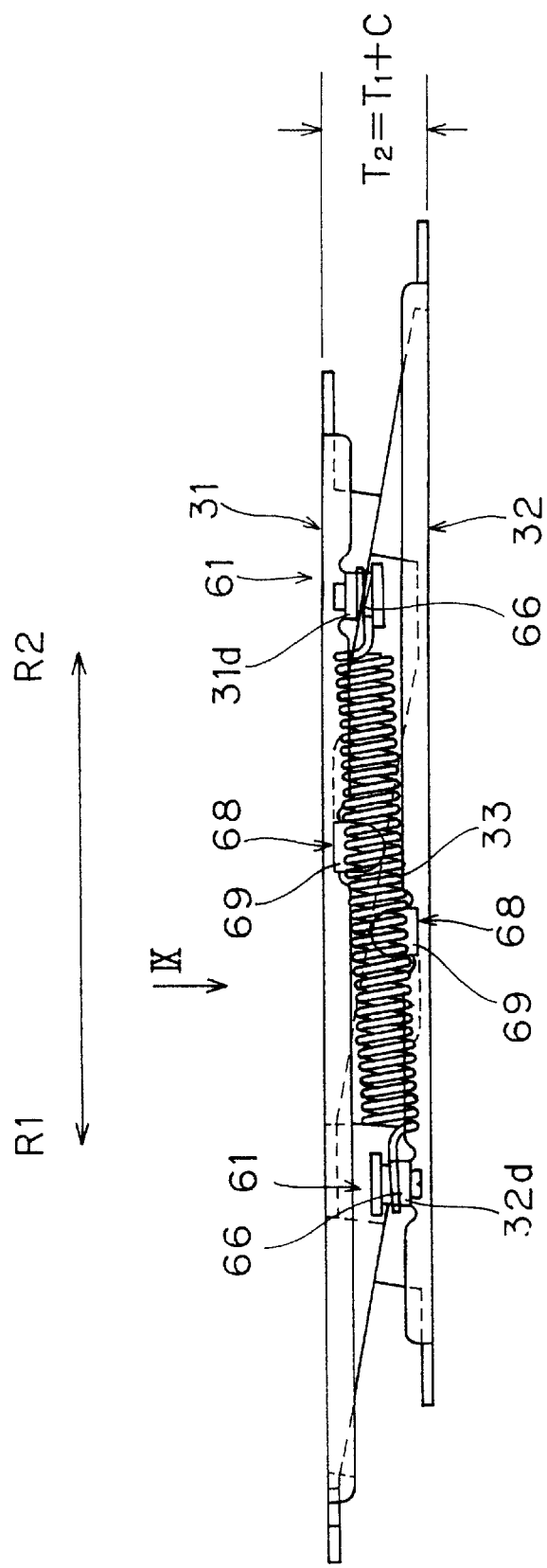
FIG. 10 is a side elevational view of the biasing mechanism utilized in the clutch cover assembly in accordance with the first embodiment of the present invention illustrated in FIG. 1.

When wear occurs in the friction facings 11 during engagement of the clutch device, the pressure plate 22 and the fulcrum ring 23 move toward the friction facings 11 by the amount of wear. At this time, the bolts 38 of the regulating mechanism 25 move toward the engine together with the pressure plate 22. However, the bushings 39 cannot move because the flanges 39b abut on the opposing member 21c. Therefore, the bolts 38 move in the axial direction against the bushings 39. As a result, as shown in FIG. 10, the space B is equal to the wear amount of the friction facings 11. The space B is formed between the projection portion 23b of the fulcrum ring 23 and an end of the tubular portion 39a of the bushing 39. The axial space between the flange 39b of the bushing 39 and the head portion 38c of the bolt 38 decreases by the wear amount and becomes A', where A' is A-B.

In disengaging the clutch device, the fulcrum ring 23 move toward the transmission by the biasing force of the biasing mechanism 24 until the fulcrum ring 23 abuts on the bushings 39. Once the projection portion 23b of the fulcrum ring 23 abuts on the tubular portions 39a of the bushings 39, the fulcrum ring 23 stops moving away from the pressure plate 22. As mentioned above, this is because the sliding resistance between the bolts 38 and the bushings 39 is set larger than the sum of the reaction of the strap plates 42 and the biasing force of the biasing mechanism 24. As a result, over adjustment of the wear (which refers to a phenomenon where the fulcrum ring 23 moves relative to the pressure plate 22 by more than the wear amount) is less likely to occur.

Figure 11:
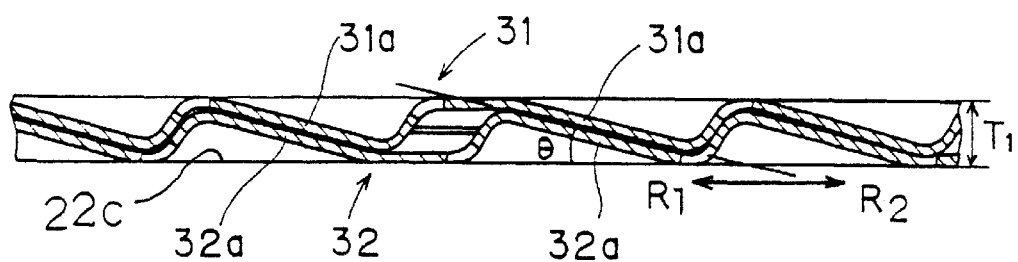
FIG. 11 is a partial cross-sectional view of a wedge structure comprising tilted surfaces for the clutch cover assembly in accordance with the first embodiment of the present invention illustrated in FIG. 1.
Figure 12:
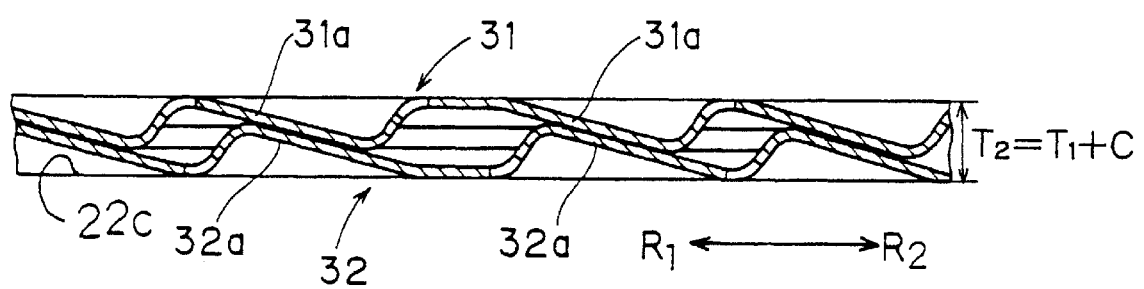
FIG. 12 is a partial cross-sectional view of a wedge structure comprising tilted surfaces for the clutch cover assembly in accordance with the first embodiment of the present invention illustrated in FIG. 1.
Figure 13:
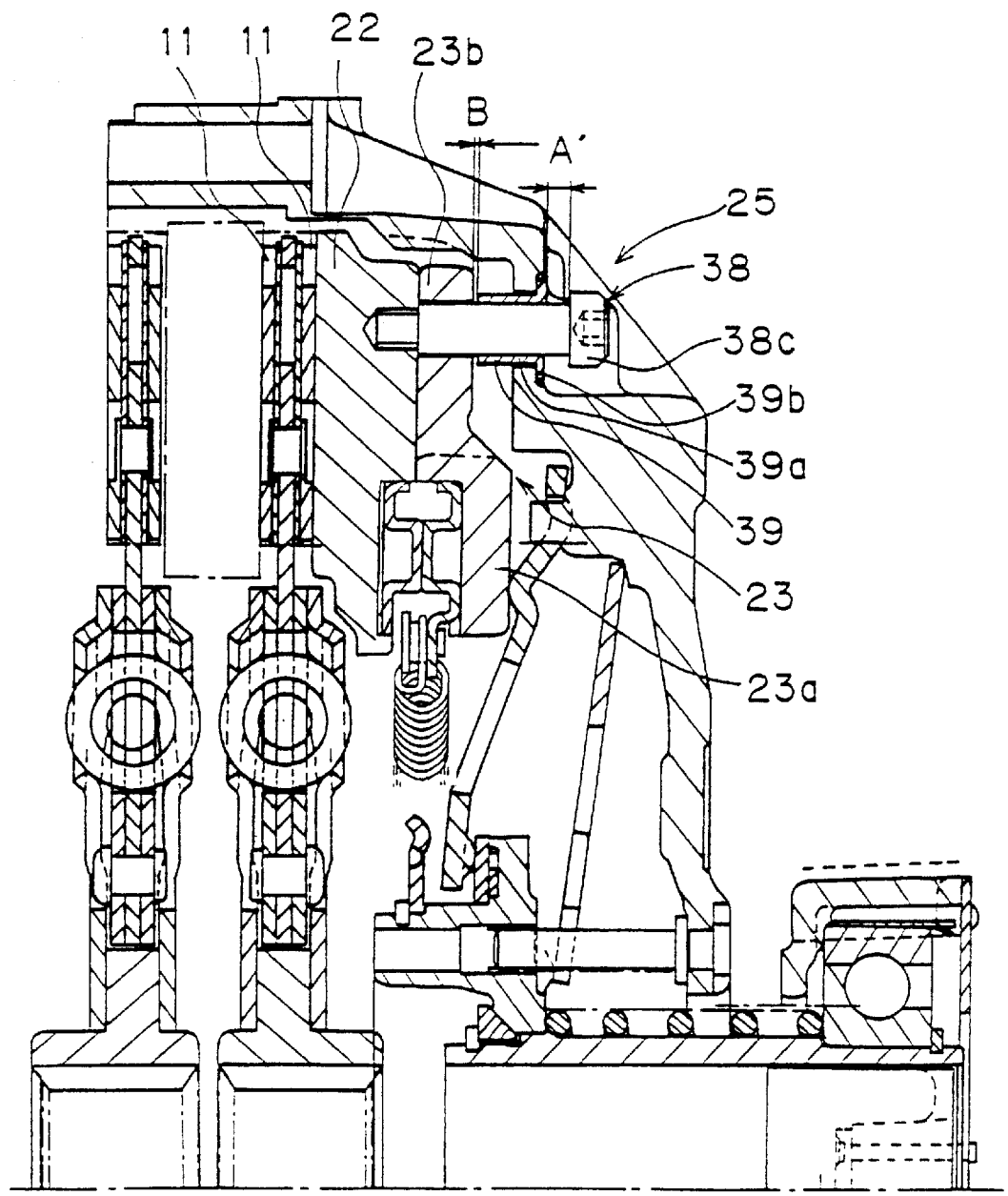
FIG. 13 is a simplified vertical cross-sectional view of the clutch cover assembly showing the operation of the clutch disk for the clutch cover assembly in accordance with the first embodiment of the present invention illustrated in FIG. 1.
Figure 14:
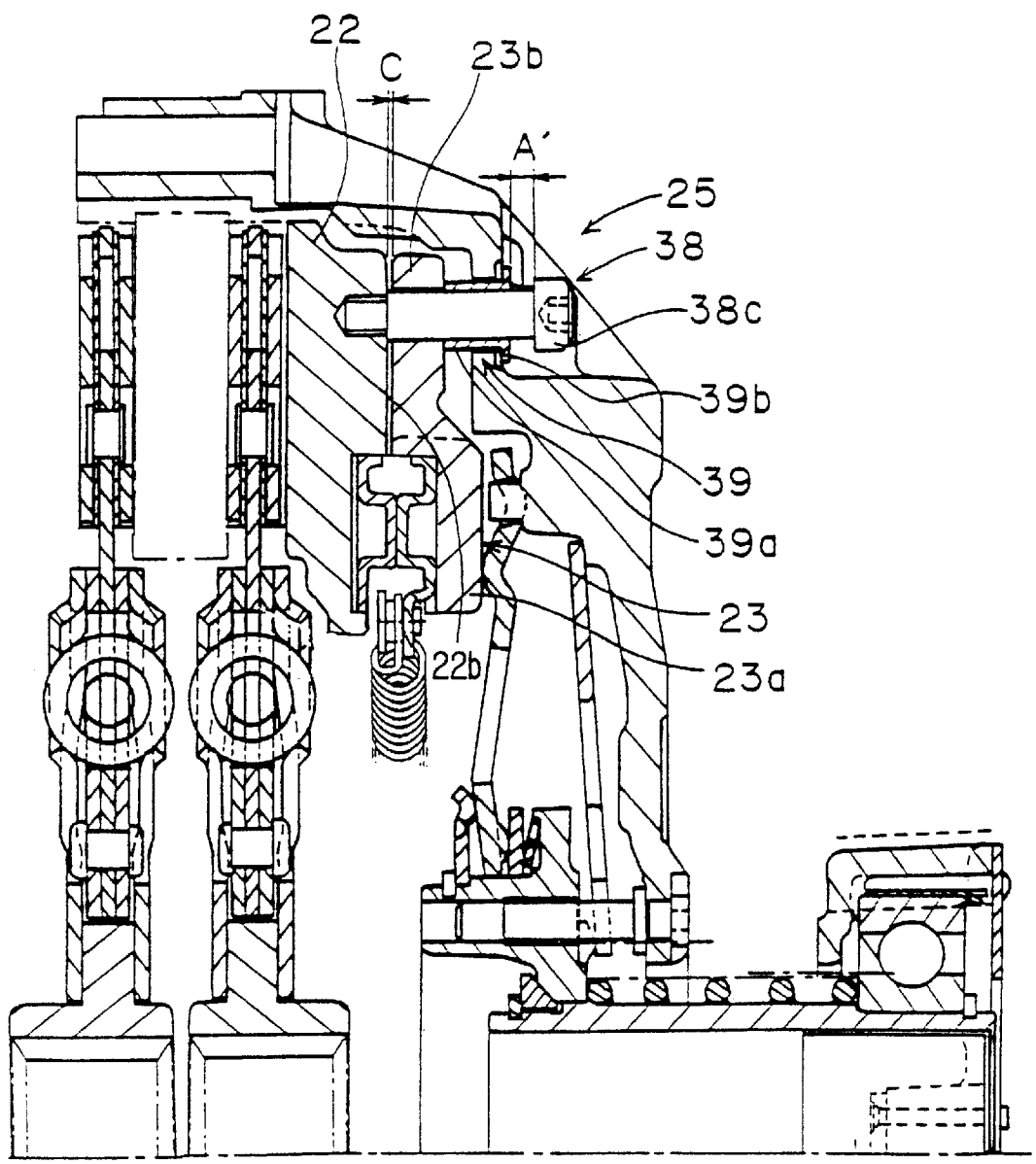
FIG. 14 is a simplified vertical sectional view of the clutch disk to show the operation of the clutch disk for the clutch cover assembly in accordance with the first embodiment of the present invention illustrated in FIG. 1.
Figure 15:
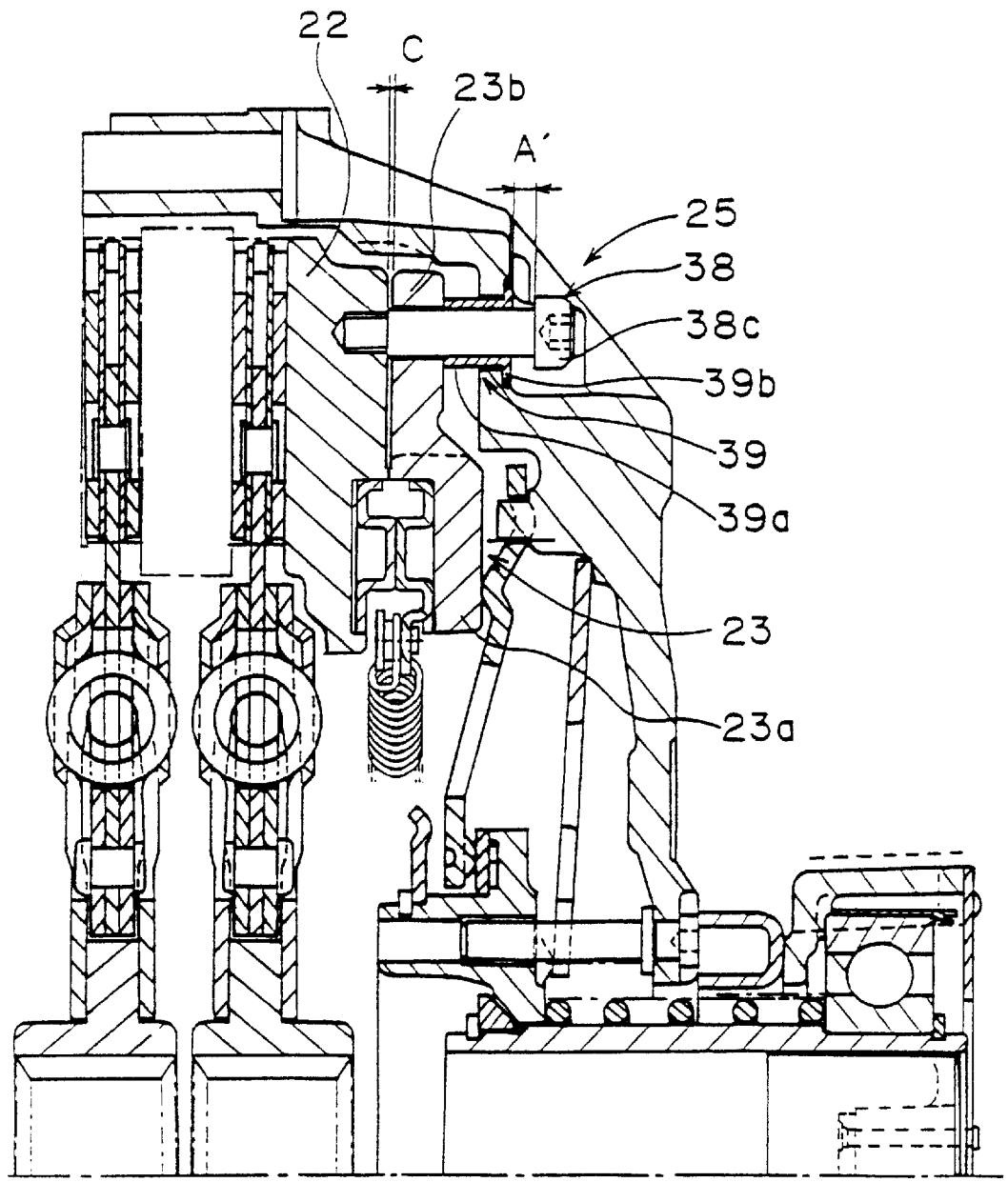
FIG. 15 is a simplified vertical cross-sectional view of the clutch cover assembly showing the operation of the clutch disk for the clutch cover assembly in accordance with the first embodiment of the present invention illustrated in FIG. 1.

As a result of the operations described above, the space C, which is equal to the wear amount B which was described earlier, is formed between the second side surface 22b of the pressure plate 22 and the fulcrum ring 23 as shown in FIG. 11. In engaging the clutch, the situation changes to that shown in FIG. 12. Comparing FIG. 12 with FIG. 2, in FIG. 12 the space C is formed between the pressure plate 22 and the fulcrum ring 23. Also the space A' between the flange members 39b of the bushings 39 and the head portions 38c of the bolts 38 is smaller than the initial space A by the wear amount B.

Since the bolts 38 and the bushings 39 for detecting the wear amount are disposed outside the pressure plate 22 in the structure of the regulating mechanism 25, the friction connecting portion for regulating the movement of the fulcrum ring 23 is less likely to be affected by the heat generated at the pressure plate 22 on the friction surface 22a side. As a result, the amount of the sliding resistance between the bolts 38 and the bushings 39 remains stable for a long period of time.

In addition, since the bolts 38 and the bushings 39 are separate from the pressure plate 22 or the clutch cover 21, it is easy to set the sliding resistance at the friction connecting portions. The regulating mechanisms 25 are constructed by installing the bushings 39 about the bolts 38 before installing the regulating mechanism 25 on the clutch cover assembly 1. In other words, the sliding resistance of the friction connecting portions is set outside the clutch cover assembly 1. In addition, since the pressure plate 22 and the flywheel 2 do not have a friction connecting portion, it is even easier to set the sliding resistance at the friction connecting portions of the bushings 39 and the bolts 38. In conventional pressure plate and clutch cover which have friction connecting portions, it is difficult to set the sliding resistance since the weight of load has to be controlled through holes formed on these members.

It is easy to install or remove the regulating mechanisms 25 on or from the clutch cover assembly 1. Each regulating mechanism 25 can be installed on or removed from the clutch cover assembly 1 from the transmission side of the clutch cover 21 with the tapped holes 22e of the pressure plate 22, the second axial holes 23c of the fulcrum ring 23, and the first axial holes 21d of the clutch cover 21 being set in the matching positions.

Since the head portions 38c are formed by the bolts 38, the space A between the head portions 38c of the bolts 38 and the flanges 39b of the bushings 39 becomes shorter as the friction facings 11 wear and the wear adjustment is operated. Since the space A can be observed from outside the clutch cover assembly 1, the time to replace the clutch cover assembly 1 can be easily determined.

Because the fulcrum ring 23 is engaged with the strap plates 42 rotatably and movably in the axial direction, the angle of the strap plates 42 do not change even when the friction facings 11 wear. This is because the axial position of the fulcrum ring 23 does not change relative to the flywheel 2 and the clutch cover 21. When the strap plates 42 are fixedly coupled to the pressure plate 22, the angles of the strap plates 42 change as the pressure plate 22 moves to compensate the wear in the friction facings 11.

Following is a description on the operation of the biasing mechanism 24. As the friction facings 11 wear and the fulcrum ring 23 becomes movable toward the transmission, the second support plate 32 rotates to the $R_2$ direction relative to the first support plate 31. As a result, the situation shifts from the state shown in FIGS. 7, 8, and 11 to the state shown in FIGS. 9, 10, and 12. In other words, as the second support plate 32 rotates being biased by the return springs 33, the second tilted surfaces 32a lift up the first tilted surfaces 31a of the first support plate 31. In that way, the fulcrum ring 23 moves away from the pressure plate 22 until the fulcrum ring 23 abuts on the bushings 39 of the regulating mechanisms 25.

Figure 9:
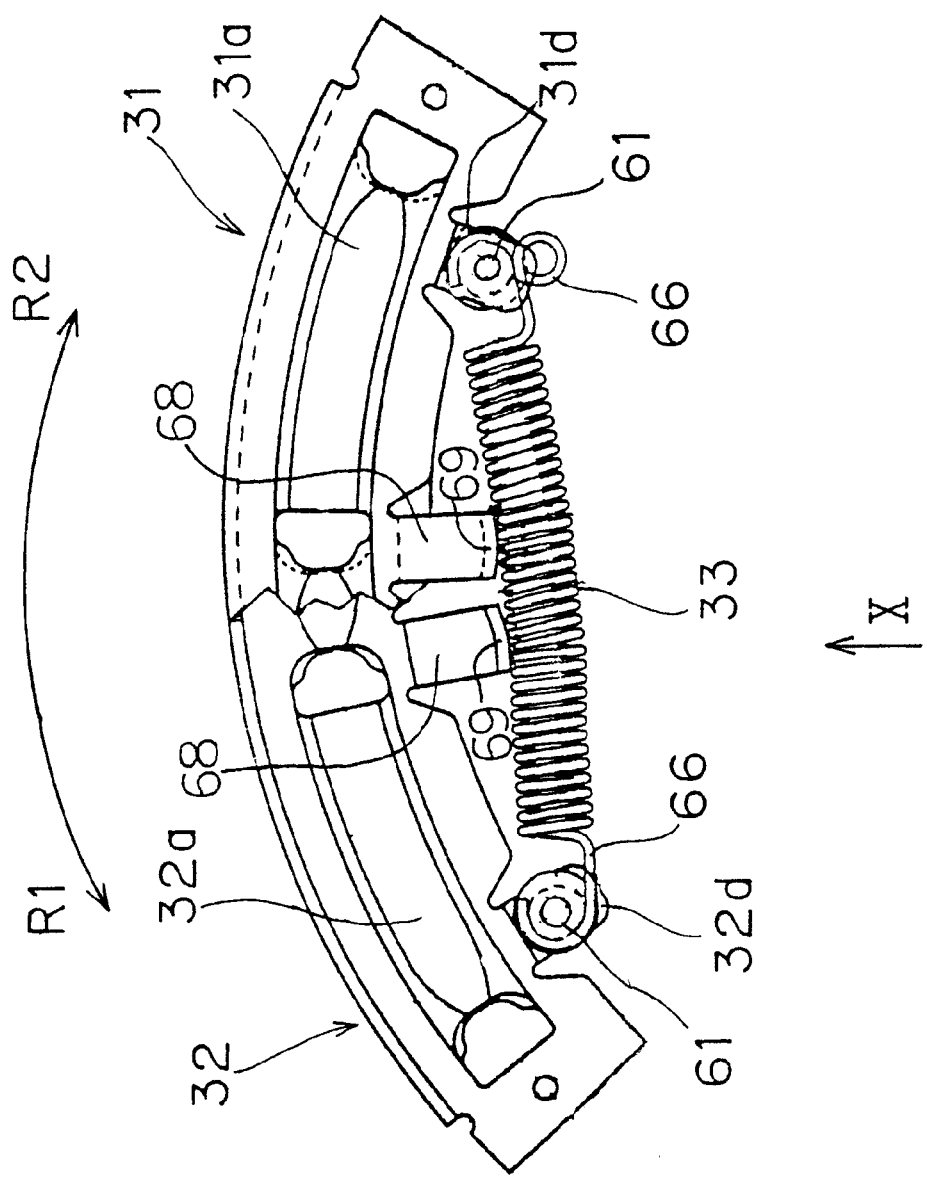
FIG. 9 is a partial plan view of the biasing mechanism of the clutch cover assembly in accordance with the first embodiment of the present invention illustrated in FIG. 1.

When the initial axial height between the first support plate 31 and the second support plate 32 is T1, the axial height after the operation is T2, where T2 is T1 minus the wear amount C. Then, as shown in FIG. 9, the return springs 33 moves radially outward and sometimes abut on the abutting portions 69 of the stays 68 as the spring connecting portion 31d and the spring connecting portion 32d corresponding to the same return springs 33 approach each other. When this happens, as shown in FIG. 10, as the first support plate 31 and the second support plate 32 move away from each other in the axial direction, the rivets 61 on both of the end portions 66 of the return spring 33 change the axial positions. As a result, the return springs 33 become slightly tilted. In this state, the end portions 66 of the return springs 33 are axially movable and deformable on the body portion 62, and the end portions 66 are not likely to generate stress.

The stays 68 keep the amount of deflection of the return springs 33 constant, both at the initial state and when wear occurs and the return springs 33 deflects radially outward due to the centrifugal force. Since the stays 68 prohibit deflection due to the centrifugal force at the return springs 33, the return springs 33 are less likely to break. Especially, breakage and wear can be prevented at contacting portion at the ends 66 of the return spring 33.

The stays 68 that correspond to the same return springs 33 approach each other and eventually abut on each other, as the wear at the friction facings 11 increases. The stays 68 abutting on each other prevent the first support plate 31 and the second support plate 32 from rotating relative to each other any further. That is, the fulcrum ring 23 stops moving axially. In this way, when the wear at the friction facings 11 reaches a predetermined amount, the stays 68 stop the biasing by the biasing mechanism 24.

In this embodiment, since the ends 66 of the return springs 33 are connected with an outer peripheral surface of the rivets 61 installed on the first and second support plates 31 and 32, the contacting area is quite broad. Therefore, the pressure per area is small and wear and breakage are less likely to happen. Also, the return springs 33 and opposing members (rivets) are less likely to suffer from wear and breakage.

In the structure of this embodiment where the return spring 33 is disposed on an inner peripheral side of the annular space, the end portions of the return springs 33 and portions that engage with the end portions tend to slide against each other due to radially outward deflection of the return springs 33. This can lead to wear and breakage on the sliding portion. The present invention prevents deflection of the return springs 33 with the stays 68 and decreases the pressure per area at the sliding portion with the rivets 61, thereby preventing wear and breakage.

SECOND EMBODIMENT

Figure 16:
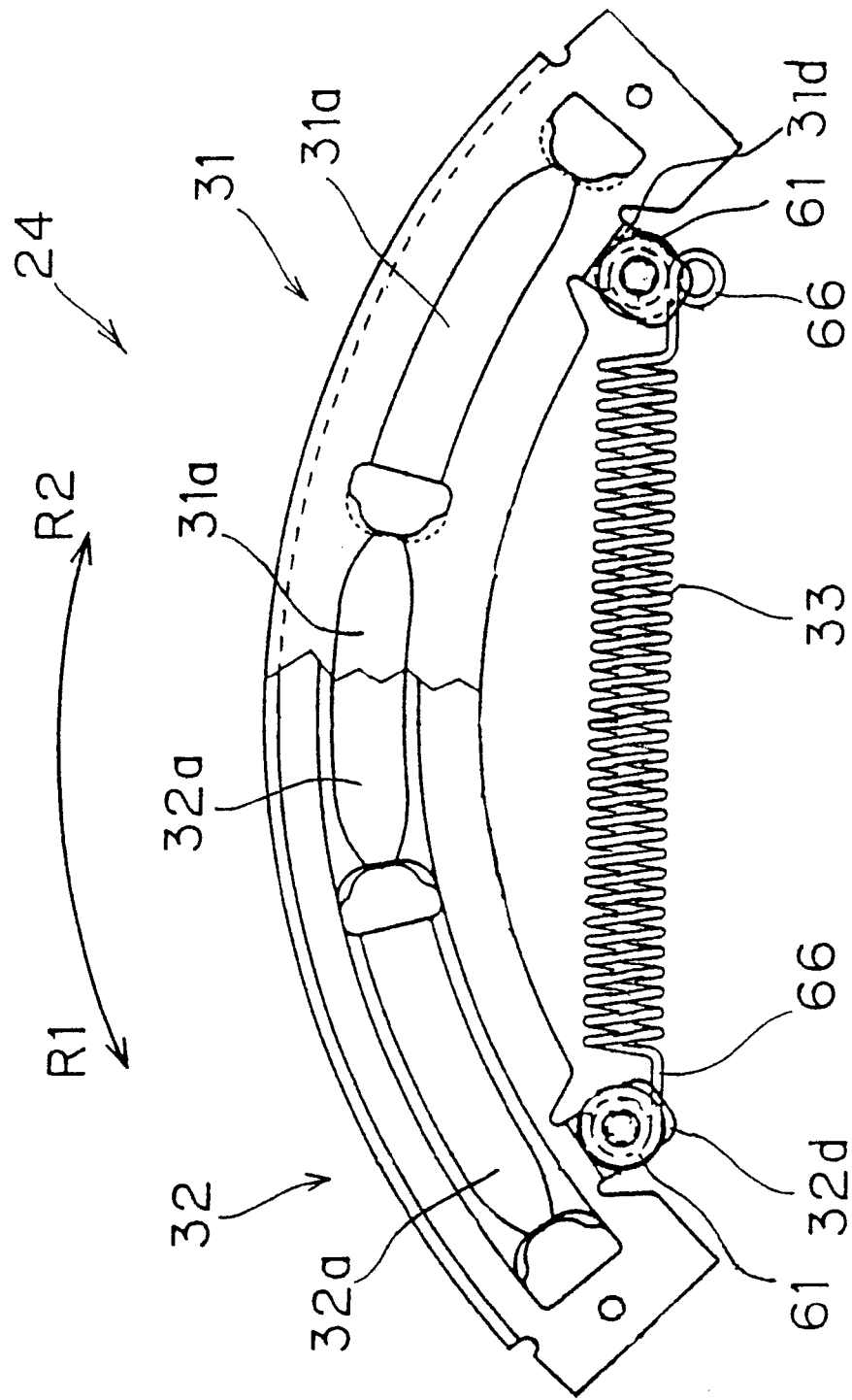
FIG. 16 is a partial plan view of the biasing mechanism utilized in a clutch cover assembly in accordance with a second embodiment of the present invention.

Although the previous invention used both stays and rivets, using only one of the stays and the rivets still achieves the effect of the present invention. In a structure shown in FIG. 16, the ends 66 of the return spring 33 are wound around the rivets 61 which are fixed to the first and the second support plates 31 and 32. Since the outer peripheries of the rivets 61 are circumferential surfaces, the contacting areas between the end portions 66 and the rivets 61 are large, which makes wear and brokerage between the end portions 66 and the rivets 61 less likely to happen.

Figure 17:
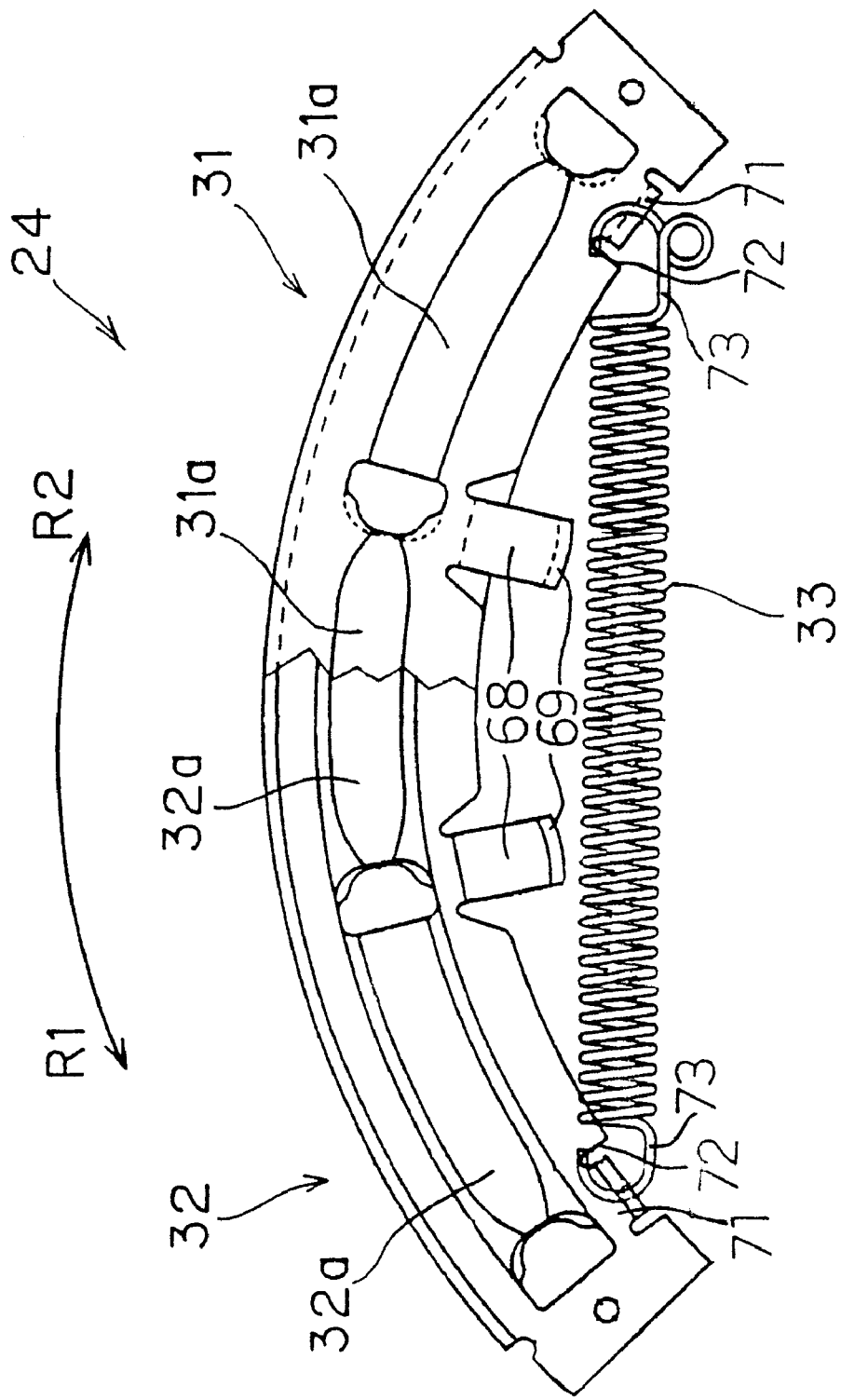
FIG. 17 is a partial plan view of the biasing utilized in a clutch cover assembly in accordance with the second embodiment of the present invention illustrated in FIG. 16.

In the structure shown in the FIG. 17, stays 68 which are substantially the same as the ones in the previous embodiment are installed on an outer peripheral side of the return springs 33. The end portions 73 of each of the return springs 33 are engaged inside openings 72 formed on the spring connecting portions 71 extending from the first and the second support plates 31 and 32. In this embodiment, since the stays 68 prevent radially outward deflection of the return spring 33, wear and breakage are less likely to happen at the end portions 73 and the openings 72.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch cover assembly adapted to engage a clutch by biasing friction facings of a clutch disk assembly toward a flywheel, comprising:
    a clutch cover adapted to be fixedly coupled to the flywheel and having an opposing portion facing towards the friction facings;
    an annular pressure plate movably coupled to said clutch cover and adapted to be disposed adjacent to the friction facings between the friction facings and said opposed portion of said clutch cover, said annular pressure plate having a first side and a second side, with said first side of said pressure plate facing the friction facings and said second side of said pressure plate facing said opposing portion;
    a fulcrum ring movably coupled between said clutch cover and said pressure plate and being disposed on said second side of said pressure plate;
    a pressure member movably supported between said clutch cover and said fulcrum ring for pressing said fulcrum ring toward said pressure plate;
    a biasing mechanism coupled to said fulcrum ring to axially bias said fulcrum ring away from said pressure plate, said biasing mechanism being disposed between said pressure plate and said fulcrum ring and having a first wedge member, a second wedge member and a tension spring, said first and second wedge members having first and second body portions which are rotatable relative to each other in a circumferential direction, said first and second body portions forming first and second tilted surfaces which are adjacent to each other respectively, and said tension spring being disposed radially inward of an inner circumference of said first and second wedge members to bias said first and second wedge members relative to each other in the circumferential direction, at least one of said first and second wedge members having a preventing portion extending radially inwardly therefrom to a free end that is located adjacent a portion of said tension spring to limit outward deflection of said tension spring in a radial direction; and
    a regulating mechanism engaging said fulcrum ring to prevent axial movement while there is no wear in the friction facings, to detect the amount of wear and to allow said fulcrum ring to move axially by a distance corresponding to the amount of wear when the friction facings begin to wear.

2. A clutch cover assembly as set forth in claim 1, wherein an annular space is formed between said pressure plate and said fulcrum ring, with said first and second wedge members being disposed in said annular space, and said tension spring being disposed in a radially inner circumference of said annular space.

3. A clutch cover assembly as set forth in claim 2, wherein said first and second body portions of said first and second wedge members are annular members with said first body portion forming a plurality of said first tilted surfaces and said second body portion forming a plurality of said second tilted surfaces.

4. A clutch cover assembly as set forth in claim 1, wherein said first and second body portions of said first and second wedge members are annular members with said first body portion forming a plurality of said first tilted surfaces and said second body portion forming a plurality of said second tilted surfaces.

5. A clutch cover assembly as set forth in claim 4, wherein said first and second wedge members are constructed from sheet metal.

6. A clutch cover assembly as set forth in claim 2, wherein said first and second wedge members are constructed from sheet metal.

7. A clutch cover assembly as set forth in claim 1, wherein said first and second wedge members are constructed from sheet metal.

8. A clutch cover assembly as set forth in claim 1, wherein said biasing mechanism further includes an engagement portion disposed on each of said first and second wedge members, with each of said engagement portions having a circumferential surface for engaging with an end of said tension spring.

9. A clutch cover assembly as set forth in claim 1, wherein said biasing mechanism further includes an engagement portion disposed on each of said first and second wedge members, with each of said engagement portions having a circumferential surface for engaging with an end of said tension spring.

10. A clutch cover assembly as set forth in claim 9, wherein said ends of said tension spring are curved and wound around an outer periphery surface of one of said engagement portions, said outer periphery surfaces of said engagement portions are cylindrical surfaces with diameters being substantially the same as the diameter of said ends of said tension spring.

11. A clutch cover assembly as set forth in claim 9, wherein said engagement portions extend axially relative to said clutch cover and have an axial length that allows axial movement of said ends of said tension spring.

12. A clutch cover assembly as set forth in claim 10 wherein said engagement portions are rivets fixedly coupled to said first and second wedge members.

13. A clutch cover assembly as set forth in claim 12, wherein said engagement portions extend axially relative to said clutch cover and have an axial length that allows axial movement of said ends of said tension spring.

14. A clutch cover assembly as set forth in claim 2, wherein said biasing mechanism further includes an engagement portion disposed on each of said first and second wedge members, with each of said engagement portions having a circumferential surface for engaging with an end of said tension spring.

15. A clutch cover assembly as set forth in claim 4, wherein said biasing mechanism further includes an engagement portion disposed on each of said first and second wedge members, with each of said engagement portions having a circumferential surface for engaging with an end of said tension spring.

16. A clutch cover assembly as set forth in claim 7, wherein said biasing mechanism further includes an engagement portion disposed on each of said first and second wedge members, with each of said engagement portions having a circumferential surface for engaging with an end of said tension spring.

17. A clutch cover assembly adapted to engage a clutch by biasing friction facings of a clutch disk assembly toward a flywheel, comprising:

a clutch cover adapted to be fixedly coupled to the flywheel and having an opposing portion facing towards the friction facings;

an annular pressure plate movably coupled to said clutch cover and adapted to be disposed adjacent to the friction facings between the friction facings and said opposed portion of said clutch covers said annular pressure plate having a first side and a second side, with said first side of said pressure plate facing the friction facings and said second side of said pressure plate facing said opposing portion;

a fulcrum ring movably coupled between said clutch cover and said pressure plate and being disposed on said second side of said pressure plate;

a pressure member movably supported between said clutch cover and said fulcrum ring for pressing said fulcrum ring toward said pressure plate;

a biasing mechanism coupled to said fulcrum ring to axially bias said fulcrum ring away from said pressure plate, aid biasing mechanism being disposed between said pressure plate and said fulcrum ring and having a first wedge member, a second wedge member and a tension spring, said first and second wedge members having first and second body portions which are rotatable relative to each other in a circumferential direction, said first and second body portions forming first and second tilted surfaces which are adjacent to each other respectively and said tension spring being disposed on an inner circumference of said first and second wedge members to bias said flat and second wedge members relative to each other in the circumferential direction; and a regulating mechanism engaging said fulcrum ring to prevent axial movement while there is no wear in the friction facings, to detect the amount of wear and to allow said fulcrum ring to move axially by a distance corresponding to the amount of wear when the friction facings begin to wear, said biasing mechanism further including a preventing portion installed on at least one of said first and second wedge members for preventing radially outward deflection of said tension spring, said preventing portion extending from each of said first and second body portions with said preventing portion of said first wedge member and said preventing portion of said second wedge member being adapted to be adjacent to each other in a circumferential direction when a predetermined amount of wear has occurred in the friction facings.

18. A clutch cover assembly as set forth in claim 17, wherein said preventing portions extend radially inward from said first and second body portions such that said preventing portions are positioned adjacent to said tension spring in the radial direction, with a gap being formed between said preventing portions and said tension spring in the radial direction.

19. A clutch cover assembly as set forth in claims 18, wherein said biasing mechanism further includes an engagement portion disposed on each of said first and second wedge members, with each of said engagement portions having a circumferential surface for engaging with an end of said tension spring.

* * * * *